(12) United States Patent
Kim et al.

(10) Patent No.: US 8,938,463 B1
(45) Date of Patent: Jan. 20, 2015

(54) MODIFYING SEARCH RESULT RANKING BASED ON IMPLICIT USER FEEDBACK AND A MODEL OF PRESENTATION BIAS

(75) Inventors: Hyung-Jin Kim, Sunnyvale, CA (US); Adrian D. Corduneanu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 836 days.

(21) Appl. No.: 11/685,095

(22) Filed: Mar. 12, 2007

(51) Int. Cl.
*G06F 17/30* (2006.01)

(52) U.S. Cl.
USPC .......................................................... 707/751

(58) Field of Classification Search
USPC .......................................................... 707/751
See application file for complete search history.

(56) References Cited

U.S. PATENT DOCUMENTS

| | | | |
|---|---|---|---|
| 5,265,065 A | 11/1993 | Turtle | |
| 5,488,725 A | 1/1996 | Turtle | |
| 5,696,962 A | 12/1997 | Kupiec | |
| 6,006,222 A | 12/1999 | Culliss | |
| 6,014,665 A | 1/2000 | Culliss | |
| 6,026,388 A | 2/2000 | Liddy et al. | |
| 6,067,565 A | 5/2000 | Horvitz | |
| 6,078,916 A | 6/2000 | Culliss | |
| 6,078,917 A | 6/2000 | Paulsen et al. | |
| 6,088,692 A | 7/2000 | Driscoll | |
| 6,182,068 B1 | 1/2001 | Culliss | |
| 6,185,559 B1 | 2/2001 | Brin et al. | |
| 6,249,252 B1 | 6/2001 | Dupray | |
| 6,285,999 B1 | 9/2001 | Page | |
| 6,321,228 B1 | 11/2001 | Crandall et al. | |
| 6,327,590 B1 * | 12/2001 | Chidlovskii et al. .............. 707/5 |
| 6,341,283 B1 | 1/2002 | Yamakawa et al. | |
| 6,353,849 B1 | 3/2002 | Linsk | |
| 6,363,378 B1 | 3/2002 | Conklin et al. | |
| 6,370,526 B1 | 4/2002 | Agrawal et al. | |
| 6,421,675 B1 | 7/2002 | Ryan et al. | |

(Continued)

FOREIGN PATENT DOCUMENTS

| | | |
|---|---|---|
| WO | WO 00/77689 | 12/2000 |
| WO | WO 01/16807 | 3/2001 |

(Continued)

OTHER PUBLICATIONS

Boyan, Freitag, Joachims, "A Machine Learning Architecture for Optimizing Web Search Engines"; Oct. 9, 1996; AAAI Techincal Report Ws-96-06.*

(Continued)

*Primary Examiner* — Ajay Bhatia
*Assistant Examiner* — Kurt Mueller
(74) *Attorney, Agent, or Firm* — Fish & Richardson P.C.

(57) ABSTRACT

The present disclosure includes systems and techniques relating to ranking search results of a search query. In general, the subject matter described in this specification can be embodied in a computer-implemented method that includes: receiving multiple features, including a first feature indicative of presentation bias that affects document result selection for search results presented in a user interface of a document search service; obtaining, based on the multiple features, information regarding document result selections for searches performed using the document search service; generating a prior model using the information, the prior model representing a background probability of document result selection given values of the multiple features; and outputting the prior model to a ranking engine for ranking of search results to reduce influence of the presentation bias.

27 Claims, 8 Drawing Sheets

(56) References Cited

U.S. PATENT DOCUMENTS

| | | |
|---|---|---|
| 6,480,843 B2 | 11/2002 | Li |
| 6,490,575 B1 * | 12/2002 | Berstis ............................. 707/3 |
| 6,526,440 B1 | 2/2003 | Bharat |
| 6,529,903 B2 | 3/2003 | Smith et al. |
| 6,539,377 B1 | 3/2003 | Culliss |
| 6,560,590 B1 | 5/2003 | Shwe et al. |
| 6,567,103 B1 | 5/2003 | Chaudhry |
| 6,587,848 B1 | 7/2003 | Aggarwal et al. |
| 6,615,209 B1 | 9/2003 | Gomes |
| 6,623,529 B1 | 9/2003 | Lakritz |
| 6,658,423 B1 | 12/2003 | Pugh et al. |
| 6,671,681 B1 * | 12/2003 | Emens et al. .................... 707/5 |
| 6,678,681 B1 | 1/2004 | Brin et al. |
| 6,701,309 B1 | 3/2004 | Beeferman et al. |
| 6,725,259 B1 | 4/2004 | Bharat |
| 6,738,764 B2 | 5/2004 | Mao et al. |
| 6,754,873 B1 | 6/2004 | Law et al. |
| 6,792,416 B2 * | 9/2004 | Soetarman et al. ............... 707/3 |
| 6,795,820 B2 | 9/2004 | Barnett |
| 6,816,850 B2 | 11/2004 | Culliss |
| 6,853,993 B2 | 2/2005 | Ortega et al. |
| 6,877,002 B2 | 4/2005 | Prince |
| 6,882,999 B2 | 4/2005 | Cohen et al. |
| 6,901,402 B1 | 5/2005 | Corston-Oliver et al. |
| 6,944,611 B2 | 9/2005 | Flank et al. |
| 6,944,612 B2 * | 9/2005 | Roustant et al. .................. 707/3 |
| 6,954,750 B2 | 10/2005 | Bradford |
| 6,990,453 B2 | 1/2006 | Wang et al. |
| 7,016,939 B1 | 3/2006 | Rothwell et al. |
| 7,028,027 B1 | 4/2006 | Zha et al. |
| 7,072,886 B2 | 7/2006 | Salmenkaita et al. |
| 7,085,761 B2 | 8/2006 | Shibata |
| 7,113,939 B2 * | 9/2006 | Chou et al. ....................... 707/3 |
| 7,117,206 B1 | 10/2006 | Bharat et al. |
| 7,136,849 B2 | 11/2006 | Patrick |
| 7,146,361 B2 * | 12/2006 | Broder et al. .................... 707/5 |
| 7,222,127 B1 | 5/2007 | Bem et al. |
| 7,231,399 B1 * | 6/2007 | Bem et al. ..................... 707/102 |
| 7,243,102 B1 | 7/2007 | Naam et al. |
| 7,266,765 B2 | 9/2007 | Golovchinsky et al. |
| 7,293,016 B1 | 11/2007 | Shakib et al. |
| 7,379,951 B2 | 5/2008 | Chkodrov et al. |
| 7,382,358 B2 | 6/2008 | Kushler et al. |
| 7,395,222 B1 | 7/2008 | Sotos |
| 7,426,507 B1 | 9/2008 | Patterson |
| 7,451,487 B2 | 11/2008 | Oliver et al. |
| 7,505,964 B2 | 3/2009 | Tong et al. |
| 7,516,146 B2 | 4/2009 | Robertson et al. |
| 7,526,470 B1 | 4/2009 | Karnawat et al. |
| 7,533,092 B2 | 5/2009 | Berkhin et al. |
| 7,533,130 B2 | 5/2009 | Narayana et al. |
| 7,552,112 B2 | 6/2009 | Jhala et al. |
| 7,565,363 B2 | 7/2009 | Anwar |
| 7,565,367 B2 | 7/2009 | Barrett et al. |
| 7,574,530 B2 | 8/2009 | Wang et al. |
| 7,584,181 B2 | 9/2009 | Zeng et al. |
| 7,610,282 B1 | 10/2009 | Datar et al. |
| 7,636,714 B1 | 12/2009 | Lamping et al. |
| 7,657,626 B1 | 2/2010 | Zwicky |
| 7,680,775 B2 | 3/2010 | Levin et al. |
| 7,693,818 B2 | 4/2010 | Majumder |
| 7,716,225 B1 | 5/2010 | Dean et al. |
| 7,747,612 B2 | 6/2010 | Thun et al. |
| 7,756,887 B1 | 7/2010 | Haveliwala |
| 7,783,632 B2 | 8/2010 | Richardson et al. |
| 7,801,885 B1 | 9/2010 | Verma |
| 7,809,716 B2 | 10/2010 | Wang et al. |
| 7,818,320 B2 | 10/2010 | Makeev |
| 7,836,058 B2 | 11/2010 | Chellapilla |
| 7,844,589 B2 | 11/2010 | Wang et al. |
| 7,849,089 B2 | 12/2010 | Zhang et al. |
| 7,853,557 B2 | 12/2010 | Schneider et al. |
| 7,877,404 B2 | 1/2011 | Achan et al. |
| 7,895,177 B2 | 2/2011 | Wu |
| 7,925,498 B1 | 4/2011 | Baker et al. |
| 7,953,740 B1 | 5/2011 | Vadon et al. |
| 7,974,974 B2 | 7/2011 | Tankovich et al. |
| 7,987,185 B1 | 7/2011 | Mysen et al. |
| 8,001,136 B1 | 8/2011 | Papachristou et al. |
| 8,019,650 B2 | 9/2011 | Donsbach et al. |
| 8,024,326 B2 | 9/2011 | Tong et al. |
| 8,024,330 B1 | 9/2011 | Franco et al. |
| 8,027,439 B2 | 9/2011 | Zoldi et al. |
| 8,037,042 B2 | 10/2011 | Anderson et al. |
| 8,037,043 B2 | 10/2011 | Zoeter et al. |
| 8,037,086 B1 | 10/2011 | Upstill et al. |
| 8,051,061 B2 | 11/2011 | Niu et al. |
| 8,060,497 B1 | 11/2011 | Zatsman et al. |
| 8,065,296 B1 | 11/2011 | Franz et al. |
| 8,069,182 B2 | 11/2011 | Pieper |
| 8,073,263 B2 | 12/2011 | Hull et al. |
| 8,073,772 B2 | 12/2011 | Bishop et al. |
| 8,086,599 B1 | 12/2011 | Heymans |
| 8,090,717 B1 | 1/2012 | Bharat et al. |
| 8,156,111 B2 | 4/2012 | Jones et al. |
| 8,224,827 B2 | 7/2012 | Dean et al. |
| 2001/0000356 A1 | 4/2001 | Woods |
| 2002/0034292 A1 * | 3/2002 | Tuoriniemi et al. .......... 379/219 |
| 2002/0042791 A1 | 4/2002 | Smith et al. |
| 2002/0049752 A1 | 4/2002 | Bowman et al. |
| 2002/0103790 A1 * | 8/2002 | Wang et al. ....................... 707/3 |
| 2002/0123988 A1 | 9/2002 | Dean et al. |
| 2002/0133481 A1 | 9/2002 | Smith et al. |
| 2002/0165849 A1 | 11/2002 | Singh et al. |
| 2003/0009399 A1 | 1/2003 | Boerner |
| 2003/0018707 A1 | 1/2003 | Flocken |
| 2003/0028529 A1 | 2/2003 | Cheung et al. |
| 2003/0037074 A1 | 2/2003 | Dwork et al. |
| 2003/0078914 A1 | 4/2003 | Witbrock |
| 2003/0120654 A1 | 6/2003 | Edlund et al. |
| 2003/0135490 A1 | 7/2003 | Barrett et al. |
| 2003/0149704 A1 | 8/2003 | Yayoi et al. |
| 2003/0167252 A1 * | 9/2003 | Odom et al. ...................... 707/1 |
| 2003/0195877 A1 | 10/2003 | Ford et al. |
| 2003/0204495 A1 | 10/2003 | Lehnert |
| 2003/0220913 A1 | 11/2003 | Doganata et al. |
| 2003/0229640 A1 | 12/2003 | Carlson et al. |
| 2004/0006456 A1 | 1/2004 | Loofbourrow et al. |
| 2004/0006740 A1 | 1/2004 | Krohn et al. |
| 2004/0034632 A1 | 2/2004 | Carmel et al. |
| 2004/0059708 A1 | 3/2004 | Dean et al. |
| 2004/0083205 A1 | 4/2004 | Yeager |
| 2004/0093325 A1 * | 5/2004 | Banerjee et al. .................. 707/3 |
| 2004/0119740 A1 | 6/2004 | Chang et al. |
| 2004/0122811 A1 | 6/2004 | Page |
| 2004/0153472 A1 | 8/2004 | Rieffanaugh, Jr. |
| 2004/0158560 A1 | 8/2004 | Wen et al. |
| 2004/0186828 A1 | 9/2004 | Yadav |
| 2004/0186996 A1 | 9/2004 | Gibbs et al. |
| 2004/0199419 A1 | 10/2004 | Kim et al. |
| 2004/0215607 A1 | 10/2004 | Travis, Jr. |
| 2005/0015366 A1 | 1/2005 | Carrasco et al. |
| 2005/0027691 A1 | 2/2005 | Brin et al. |
| 2005/0033803 A1 | 2/2005 | Vleet et al. |
| 2005/0050014 A1 | 3/2005 | Gosse et al. |
| 2005/0055342 A1 | 3/2005 | Bharat et al. |
| 2005/0055345 A1 | 3/2005 | Ripley |
| 2005/0060290 A1 | 3/2005 | Herscovici et al. |
| 2005/0060310 A1 | 3/2005 | Tong et al. |
| 2005/0060311 A1 | 3/2005 | Tong et al. |
| 2005/0071741 A1 | 3/2005 | Acharya et al. |
| 2005/0102282 A1 | 5/2005 | Linden |
| 2005/0125376 A1 | 6/2005 | Curtis et al. |
| 2005/0160083 A1 | 7/2005 | Robinson |
| 2005/0192946 A1 | 9/2005 | Lu et al. |
| 2005/0198026 A1 | 9/2005 | Dehlinger et al. |
| 2005/0222987 A1 | 10/2005 | Vadon |
| 2005/0222998 A1 | 10/2005 | Driessen et al. |
| 2005/0240576 A1 | 10/2005 | Piscitello et al. |
| 2005/0240580 A1 | 10/2005 | Zamir et al. |
| 2005/0256848 A1 | 11/2005 | Alpert et al. |
| 2006/0047643 A1 | 3/2006 | Chaman |
| 2006/0069667 A1 | 3/2006 | Manasse et al. |
| 2006/0089926 A1 | 4/2006 | Knepper et al. |

(56) References Cited

U.S. PATENT DOCUMENTS

| | | | |
|---|---|---|---|
| 2006/0095421 A1 | 5/2006 | Nagai et al. | |
| 2006/0106793 A1 | 5/2006 | Liang | |
| 2006/0173830 A1 | 8/2006 | Smyth et al. | |
| 2006/0195443 A1 | 8/2006 | Franklin et al. | |
| 2006/0200476 A1 | 9/2006 | Gottumukkala et al. | |
| 2006/0200556 A1 | 9/2006 | Brave et al. | |
| 2006/0230040 A1 | 10/2006 | Curtis et al. | |
| 2006/0293950 A1* | 12/2006 | Meek et al. | 705/14 |
| 2007/0005575 A1 | 1/2007 | Dai et al. | |
| 2007/0005588 A1 | 1/2007 | Zhang et al. | |
| 2007/0038659 A1 | 2/2007 | Datar et al. | |
| 2007/0061211 A1 | 3/2007 | Ramer et al. | |
| 2007/0081197 A1 | 4/2007 | Omoigui | |
| 2007/0106659 A1 | 5/2007 | Lu et al. | |
| 2007/0112730 A1 | 5/2007 | Gulli et al. | |
| 2007/0130370 A1* | 6/2007 | Akaezuwa | 710/1 |
| 2007/0156677 A1 | 7/2007 | Szabo | |
| 2007/0192190 A1 | 8/2007 | Granville | |
| 2007/0208730 A1 | 9/2007 | Agichtein et al. | |
| 2007/0214131 A1 | 9/2007 | Cucerzan et al. | |
| 2007/0233653 A1 | 10/2007 | Biggs et al. | |
| 2007/0255689 A1 | 11/2007 | Sun et al. | |
| 2007/0260597 A1 | 11/2007 | Cramer | |
| 2007/0266021 A1 | 11/2007 | Aravamudan et al. | |
| 2007/0266439 A1 | 11/2007 | Kraft | |
| 2007/0288450 A1 | 12/2007 | Datta et al. | |
| 2008/0010143 A1 | 1/2008 | Kniaz et al. | |
| 2008/0027913 A1 | 1/2008 | Chang et al. | |
| 2008/0052219 A1 | 2/2008 | Sandholm et al. | |
| 2008/0052273 A1 | 2/2008 | Pickens | |
| 2008/0059453 A1 | 3/2008 | Laderman | |
| 2008/0077570 A1 | 3/2008 | Tang et al. | |
| 2008/0082518 A1 | 4/2008 | Loftesness | |
| 2008/0091650 A1 | 4/2008 | Fontoura et al. | |
| 2008/0114624 A1 | 5/2008 | Kitts | |
| 2008/0114729 A1 | 5/2008 | Raman et al. | |
| 2008/0114750 A1 | 5/2008 | Saxena et al. | |
| 2008/0140699 A1 | 6/2008 | Jones et al. | |
| 2008/0162475 A1 | 7/2008 | Meggs et al. | |
| 2008/0183660 A1 | 7/2008 | Szulczewski | |
| 2008/0189269 A1 | 8/2008 | Olsen | |
| 2008/0208825 A1 | 8/2008 | Curtis et al. | |
| 2008/0228442 A1 | 9/2008 | Lippincott et al. | |
| 2008/0256050 A1 | 10/2008 | Zhang et al. | |
| 2008/0313168 A1 | 12/2008 | Liu et al. | |
| 2008/0313247 A1 | 12/2008 | Galvin | |
| 2009/0012969 A1 | 1/2009 | Rail et al. | |
| 2009/0055392 A1 | 2/2009 | Gupta et al. | |
| 2009/0157643 A1 | 6/2009 | Gollapudi et al. | |
| 2009/0182723 A1 | 7/2009 | Shnitko et al. | |
| 2009/0287656 A1 | 11/2009 | Bennett | |
| 2010/0106706 A1 | 4/2010 | Rorex et al. | |
| 2010/0131563 A1 | 5/2010 | Yin | |
| 2010/0205541 A1 | 8/2010 | Rapaport et al. | |
| 2010/0228738 A1 | 9/2010 | Mehta et al. | |
| 2010/0241472 A1 | 9/2010 | Hernandez | |
| 2011/0295844 A1 | 12/2011 | Sun et al. | |
| 2012/0191705 A1 | 7/2012 | Tong et al. | |

FOREIGN PATENT DOCUMENTS

| | | |
|---|---|---|
| WO | WO 01/67297 | 9/2001 |
| WO | WO 2004/059514 | 7/2004 |

OTHER PUBLICATIONS

Joachims T. Evaluating retrieval performance using clickthrough data. Proceedings of the SIGIR Workshop on Mathematical/Formal Methods in Information Retrieval; Aug. 12-15, 2002; Tampere, Finland; 2002.*

Radlinski, Joachims; "Query Chains : Learnign to Rank for Implict Feedback"; International Conference on Knowledge Discovery and Data Mining archive, Proceedings of the eleventh ACM SIGKDD international conference on Knowledge discovery in data mining; 2005.*

Bar-Llan, Keenoy, Levene, Yaari; "Presentation Bias is Significant in Determing User Preseference for Search Results—A User Study"; Journal of the American Society for Information Science and Technology, vol. 60, Issue 1 (p. 135-149), Sep. 2008.*

Jpachins. Radlinski; "Search Engines that Learn from Implict Feedback"; Aug. 2007, IEEE Computer Society.*

Bar-Ilan, Mat-Hassan, Levene; "Methods for comparing rankings of search engine results"; Computer Networks: The International Journal of Computer and Telecommunications Networking, vol. 50, Issue 10 (Jul. 2006).*

U.S. Appl. No. 10/726,345, filed Dec. 3, 2003, Pearson et al.

U.S. Appl. No. 10/878,926, filed Jun. 28, 2004, Battle et al.

Agichtein, et al; *Improving Web Search Ranking by Incorporating User Behavior Information*; Aug. 2006; Proceedings of the Twenty-Ninth Annual International ACM SIGIR Conference on Research and Development in Information Retrieval, p. 19-26.

Agichtein, et al; *Learning User Interaction Models for Predicting Web Search Result Performances*; Aug. 2006; Proceedings of the Twenty-Ninth Annual International ACM SIGIR Conference on Research and Development in Information Retrieval, p. 3-10.

Boyan et al.; *A Machine Learning Architecture for Optimizing Web Search Engines*; Aug. 1996; Internet-based information systems—Workshop Technical Report—American Association for Artificial Intelligence, p. 1-8.

Cutrell, et al.; *Eye tracking in MSN Search: Investigating snippet length, target position and task types*; 2007; Conference on Human Factors in Computing Systems—Proceedings of the SIGCHI Conference on Human Factors in Computing Systems.

Joachims; *Optimizing search engines using clickthrough data*; 2002; Proceedings of the ACM SIGKDD International Conference on Knowledge Discovery and Data Mining, p. 133-142.

Kelly, et al.; *Implicit Feedback for Inferring User Preference: A Bibliography*; SIGIR Forum, vol. 37, No. 2 (2003), pp. 18-28.

U.S. Appl. No. 12/331,872, filed Dec. 10, 2008, Le et al.

W3C, URIs, URLs and URNs: Classification and Recommendations 1.0, Report from the joint W3C/IETF URI Planning Interest Group, Sep. 21, 2001, 8 pages.

Joachims, "Evaluating Search Engines Using Clickthrough Data", Cornell University, Department of Computer Science, Draft, Feb. 19, 2002, 13 pages.

Jansen et al., "An Analysis of Web Documents Retrieved and Viewed", School of Information Sciences and Technology, The Pennsylvania State University, the 4th International Conference on Internet Computing, Las Vegas, Nevada, pp. 65-69, Jun. 23-26, 2003, 5 pages.

Boldi, et al.; The Query-flow Graph: Model and Applications; CKIM '08, Oct. 26-30, Napaya Valley, California, USA, pp. 609-617.

Burke, Robin, Integrating Knowledge-based and Collaborative-filtering Recommender Systems, AAAI Technical Report WS-99-01. Compilation copyright © 1999, AAAI (www.aaai.org), pp. 69-72.

Craswell, et al.; Random Walks on the Click Graph; Jul. 2007; SIGIR '07, Amsterdam, The Netherlands, 8 pages.

Diligenti, et al., *Users, Queries and Documents: A Unified Representation for Web Mining*, wi-iat, vol. 1, 2009 IEEE/WIC/ACM International Joint Conference on Web Intelligence and Intelligent Agent Technology, 2009, pp. 238-244.

Hofmann, Thomas, *Latent Semantic Models for Collaborative Filtering*, ACM Transactions on Information Systems, vol. 22, No. 1, Jan. 2004, pp. 89-115.

Google News archive, Jul. 8, 2003, Webmasterworld.com, [online] Retrieved from the Internet http://www.webmasterwolrd.com/forum3/15085.htm [retrieved on Nov. 20, 2009] 3 pages.

Grčar, Miha, *User Profiling: Collaborative Filtering*, SIKDD 2004, Oct. 12-15, 2004, Ljubljana, Slovenia, 4 pages.

U.S. Appl. No. 11/556,143, filed Nov. 2, 2006, in Office Action mailed Jul. 6, 2010, 20 pages.

U.S. Appl. No. 11/556,143, filed Nov. 2, 2006, in Office Action mailed Apr. 20, 2011, 18 pages.

McDonnell, Philip, A., "Time Based Ranking," U.S. Appl. No. 11/870,893, filed Oct. 11, 2007, 42 pages.

Nicole, Kristen, Heeii is StumbleUpon Plus Google Suggestions, [online], Retrieved from the Internet http://mashable.com/2007/05/15/heeii/, 11 pages.

(56) References Cited

OTHER PUBLICATIONS

Lemire, Daniel, *Scale and Translation Invariant Collaborative Filtering Systems*, Published in Information Retrieval, 8(1), pp. 129-150, 2005.

U.S. Appl. No. 11/556,086, filed Nov. 2, 2006, in Office Action mailed Jun. 23, 2010, 21 pages.

Schwab, et al., *Adaptivity through Unobstrusive Learning*, 2002, 16(3), pp. 5-9.

Stoilova, Lubomira et al., *GiveALink: Mining a Semantic Network of Bookmarks for Web Search and Recommendation*, LinkKDD '05, Aug. 21, 2005, Chicago, IL, USA, 8 pages.

Xiao, et al., *Measuring Similarity of Interests for Clustering Web-Users*, ADC, 2001, pp. 107-114.

Xie et al., *Web User Clustering from Access Log Using Belief Function*, K-CAP '01, Oct. 22-23, 2001, Victoria, British Columbia, Canada, pp. 202-208.

Yu et al., *Selecting Relevant Instances for Efficient and Accurate Collaborative Filtering*, CIKM '01, Nov. 5-10, 2001, Atlanta, Georgia, pp. 239-246.

Zeng et al., *Similarity Measure and Instance Selection for Collaborative Filtering*, WWW '03, May 20-24, 2003, Budapest, Hungary, pp. 652-658.

Zeng, et al., "Learning to Cluster Web Search Results", SIGIR '04, Proceedings of the 27th Annual International ACM SIGIR conference on research and development in information retrieval, 2004.

Soumen Chakrabarti, et al. "Enhanced Topic Distillation using Text, Markup tags, and Hyperlinks" ACM, Sep. 9-12, 2001, pp. 208-216.

Gabriel Somlo et al., "Using Web Hepler Agent Profiles in Query Generation", ACM, Jul. 2003, pp. 812-818.

Australian Patent Office Non-Final Office Action in AU App. Ser. No. 2004275274, mailed Feb. 3, 2010, 2 pages.

Dan Olsen et al., "Query-by-critique: Spoken Language Access to Large Lists", ACM, Oct. 2002, pp. 131-140.

Susan Gauch et al., "A Corpus Analysis Approach for Automatic Query Expansion and its Extension to Multiple Databases", ACM, Jul. 1999, pp. 250-269.

Nicolas Bruno et al., "Top-K Selection Queries over Relational Databases: Mapping Strategies and Performance Evaluation", ACM, Jun. 2002, pp. 153-187.

Ji-Rong Wen et al., "Query Clustering using User Logs", ACM, Jan. 2002, pp. 59-81.

Brin, S. and L. Page, The Anatomy of a Large-Scale Hypertextual Web Search Engine, Computer Science Department, Apr. 1998.

International Search Report and Written Opinion for Application No. PCT/US2004/029615, dated Jan. 19, 2005, 8 pages.

Hungarian Patent Office, International Search Report and Written Opinion for Application No. 200806756-3, dated Nov. 19, 2010 12 pages.

Authorized Officer Athina Nickitas-Etienne, International Preliminary Report and Written Opinion for Application No. PCT/US2004/029615, mailed Mar. 23, 2006.

Indian Office Action in Indian Application No. 686/KOLNP/2006, mailed Jun. 3, 2008, 2 pages.

Danish Search Report and Written Opinion for Application No. 200601630-7, dated Jun. 21, 2007, 15 pages.

Jones et al., "Pictures of Relevance: A Geometric Analysis of Similarity Measures", Journal of the American Society for Information Science, Nov. 1987, 23 pages.

Kaplan et al., "Adaptive Hypertext Navigation Based on User Goals and Context", User Modeling and User-Adapted Interaction 2, Sep. 1, 1993; pp. 193-220, 28 pages.

Liddy et al., "A Natural Language Text Retrieval System With Relevance Feedback", 16th National Online, May 2-6, 1995, 3 pages.

U.S. Appl. No. 11/556,143, filed Nov. 2, 2006, in Office Action mailed Jan. 25, 2010, 14 pages.

\* cited by examiner

# MODIFYING SEARCH RESULT RANKING BASED ON IMPLICIT USER FEEDBACK AND A MODEL OF PRESENTATION BIAS

BACKGROUND

The present disclosure relates to ranking of search results.

Internet search engines aim to identify documents or other items that are relevant to a user's needs and to present the documents or items in a manner that is most useful to the user. Such activity often involves a fair amount of mind-reading—inferring from various clues what the user wants. Certain clues may be user specific. For example, knowledge that a user is making a request from a mobile device, and knowledge of the location of the device, can result in much better search results for such a user.

Clues about a user's needs may also be more general. For example, search results can have an elevated importance, or inferred relevance, if a number of other search results link to them. If the linking results are themselves highly relevant, then the linked-to results may have a particularly high relevance. Such an approach to determining relevance, generally associated with the GOOGLE® PageRank technology, is premised on the assumption that, if authors of web pages felt that another web site was relevant enough to be linked to, then web searchers would also find the site to be particularly relevant. In short, the web authors "vote up" the relevance of the sites.

Other various inputs may be used instead of, or in addition to, such techniques for determining and ranking search results. For example, user reactions to particular search results or search result lists may be gauged, so that results on which users often click will receive a higher ranking. The general assumption under such an approach is that searching users are often the best judges of relevance, so that if they select a particular search result, it is likely to be relevant, or at least more relevant than the presented alternatives.

SUMMARY

Systems, methods, and apparatus including computer program products for ranking search results of a search query are described. In general, particular inputs may be generated or analyzed to affect the presentation of search results. For example, such inputs may increase the relevance that a system will assign to a particular result in a particular situation, thus boosting the score or other indicator of relevance for the result (and perhaps the relevance of the result in the context of a particular query). Such an approach may benefit a user by providing them with search results that are more likely to match their needs. As a result, users can learn more using the internet, can find more relevant information more quickly, and will thus achieve more in their work or elsewhere, and will be more likely to use such a system again. A provider of such services may also benefit, by providing more useful services to users, and by thereby inducing more traffic to their search services. Such additional traffic may provide an operator with additional revenue, such as in the form of advertising that accompanies the searching and the delivery of search results.

The subject matter described in this specification can be embodied in a computer-implemented method that includes receiving multiple features, including a first feature indicative of presentation bias that affects document result selection for search results presented in a user interface of a document search service; obtaining, based on the multiple features, information regarding document result selections for searches performed using the document search service, the information spanning multiple different queries; generating a prior model using the information spanning the multiple different queries, the prior model representing a query-independent probability of document result selection given values of the multiple features; and outputting the prior model to a ranking engine for ranking of search results to reduce influence of the presentation bias.

The receiving can include receiving the first feature including a position of a document result in the user interface of the document search service within a context of a search query for which the document result is returned. The document result can be a first document result, and the receiving can include receiving a second feature including a relevance score of a second document result within the context of the search query for which the first document result and the second document result are returned. Moreover, the receiving can include receiving a third feature comprising the relevance score of the first document result within the context of the search query for which the first document result and the second document result are returned.

The receiving can include receiving a second feature indicative of relevance for a second document result returned along with a first document result within a context of a search query, and the obtaining can include collecting the information regarding document result selections, including selection of the first document result, for multiple combinations of values for the multiple features. The receiving can include receiving a first set of features including the first feature and a second set of features including the second feature, the generating can include creating a first user selection model based on the first set of features and creating a second user selection model based on the second set of features, and the outputting can include outputting the first user selection model and the second user selection model. The receiving can include receiving the second set of features being a proper subset of the first set of features. In addition, the obtaining can include identifying, based on frequency of document result selection, a reduced set of document result selection records from one or more logs of user selections for the document search service; and collecting the information regarding document result selections from the reduced set of document result selection records.

The subject matter described in this specification can be embodied in a computer-implemented method that includes obtaining, in accordance with a first implicit user feedback model, a first signal for a document result of a search query for which the document result is returned, wherein the first signal corresponds to an aspect of document relevance; obtaining, in accordance with a second implicit user feedback model, a second signal for the document result, wherein the second signal corresponds to an aspect of search result presentation; combining the first signal and the second signal to form a relevance signal for the document result; and outputting the relevance signal to a ranking engine for ranking of search results including the document result.

The obtaining the first signal can include obtaining, in accordance with the first implicit user feedback model, a measure of relevance for the document result within a context of the search query for which the document result is returned; and the obtaining the second signal can include obtaining, in accordance with the second implicit user feedback model, a measure of presentation bias for the document result independent of the context of the search query for which the document result is returned. The operations can further include identifying an additional document result of the search query that is not included in the first implicit user feedback model;

obtaining, in accordance with a third implicit user feedback model, an additional signal for the additional document result, wherein the additional signal corresponds to an aspect of document relevance independent of the context of the search query; and outputting the additional signal to the ranking engine for ranking of the search results including the additional document result.

The obtaining the first signal can include obtaining, in accordance with the first implicit user feedback model, a measure of relevance for the document result independent of a context of the search query for which the document result is returned; and the obtaining the second signal can include obtaining, in accordance with the second implicit user feedback model, a measure of presentation bias for the document result independent of the context of the search query for which the document result is returned.

The subject matter described in this specification can be embodied in a computer-implemented method that includes receiving multiple features, including a first feature indicative of presentation bias that affects document result selection for search results presented in a user interface of a document search service, and a second feature indicative of relevance for a second document result returned along with a first document result within a context of a search query; obtaining, based on the multiple features, information regarding document result selections for searches performed using the document search service, including selection of the first document result; generating a prior model using the information, the prior model representing a probability of document result selection given values of the multiple features; and outputting the prior model to a ranking engine for ranking of search results to reduce influence of the presentation bias.

The receiving can include receiving a first set of features including the first feature and a second set of features including the second feature, the generating can include creating a first user selection model based on the first set of features and creating a second user selection model based on the second set of features, and the outputting can include outputting the first user selection model and the second user selection model. The receiving can include receiving the second set of features being a proper subset of the first set of features. The obtaining can include identifying, based on frequency of document result selection, a reduced set of document result selection records from one or more logs of user selections for the document search service; and collecting the information regarding document result selections from the reduced set of document result selection records.

The subject matter described in this specification can also be embodied in various systems, apparatus and corresponding computer program products (encoded on a computer-readable medium and operable to cause data processing apparatus to perform method operations). For example, a system can include a tracking component and a rank modifier engine structured to perform the operations described. Moreover, a system can include various means for performing the operations described, as detailed below, and equivalents thereof.

Particular embodiments of the described subject matter can be implemented to realize one or more of the following advantages. A ranking sub-system can include a rank modifier engine that uses implicit user feedback to cause re-ranking of search results in order to improve the final ranking presented to a user of an information retrieval system. User selections of search results (click data) can be tracked and transformed into a background probability of user selection in light of one or more presentation bias features, and this background probability can be used to adjust future search result rankings to reduce the influence of presentation bias on implicit user feedback. A prior model can be designed to assist in separating the effects of result quality and presentation bias on user selections, and the prior model can be used to normalize the output of a separate implicit user feedback model in view of the effects of presentation bias. Moreover, a prior model can be used to estimate what the implicit feedback should be for results that are too infrequent, or too recent to have sufficient historical records of implicit feedback applicable to them.

The details of one or more implementations are set forth in the accompanying drawings and the description below. Other features, aspects, and advantages will become apparent from the description, the drawings, and the claims.

DESCRIPTION OF THE DRAWINGS

Like reference numbers and designations in the various drawings indicate like elements.

DETAILED DESCRIPTION

Figure 1:
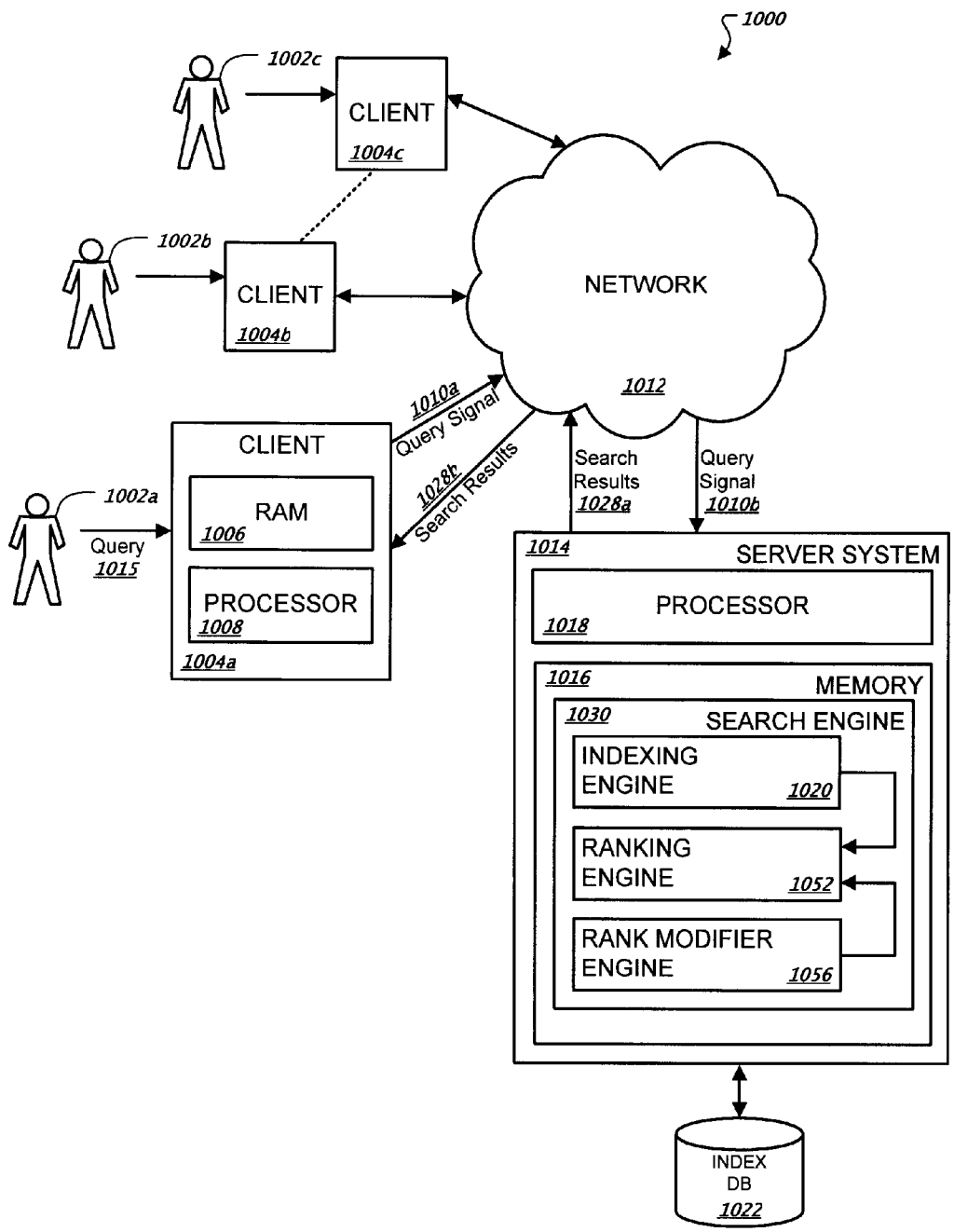
FIG. 1 shows an example information retrieval system in which the relevance of results obtained for submitted search queries can be improved.

FIG. 1 shows an example system 1000 for improving the relevance of results obtained from submitting search queries as can be implemented in an internet, intranet, or other client/server environment. The system 1000 is an example of an information retrieval system in which the systems, components and techniques described below can be implemented. Although several components are illustrated, there may be fewer or more components in the system 1000. Moreover, the components can be distributed on one or more computing devices connected by one or more networks or other suitable communication mediums.

A user 1002 (1002a, 1002b, 1002c) can interact with the system 1000 through a client device 1004 (1004a, 1004b, 1004c) or other device. For example, the client device 1004 can be a computer terminal within a local area network (LAN) or wide area network (WAN). The client device 1004 can include a random access memory (RAM) 1006 (or other memory and/or a storage device) and a processor 1008. The processor 1008 is structured to process instructions within the system 1000. In some implementations, the processor 1008 is a single-threaded processor. In other implementations, the processor 1008 is a multi-threaded processor. The processor 1008 can include multiple processing cores and is structured to process instructions stored in the RAM 1006 (or other memory and/or a storage device included with the client device 1004) to display graphical information for a user interface.

A user 1002*a* can connect to a search engine 1030 within a server system 1014 to submit a query 1015. When the user 1002*a* submits the query 1015 through an input device attached to a client device 1004*a*, a client-side query signal 1010*a* is sent into a network 1012 and is forwarded to the server system 1014 as a server-side query signal 1010*b*. Server system 1014 can be one or more server devices in one or more locations. A server device 1014 includes a memory device 1016, which can include the search engine 1030 loaded therein. A processor 1018 is structured to process instructions within the system 1014. These instructions can implement one or more components of the search engine 1030. The processor 1018 can be a single-threaded processor or a multi-threaded processor, and can include multiple processing cores. The processor 1018 can process instructions stored in the memory 1016 related to the search engine 1030 and can send information to the client device 1004, through the network 1012, to create a graphical presentation in a user interface of the client device 1004 (e.g., a search results web page displayed in a web browser).

The server-side query signal 1010*b* is received by the search engine 1030. The search engine 1030 uses the information within the user query 1015 (e.g. query terms) to find relevant documents. The search engine 1030 can include an indexing engine 1020 that actively searches a corpus (e.g., web pages on the Internet) to index the documents found in that corpus, and the index information for the documents in the corpus can be stored in an index database 1022. This index database 1022 can be accessed to identify documents related to the user query 1015. Note that, an electronic document (which for brevity will simply be referred to as a document) does not necessarily correspond to a file. A document can be stored in a portion of a file that holds other documents, in a single file dedicated to the document in question, or in multiple coordinated files.

The search engine 1030 can include a ranking engine 1052 to rank the documents related to the user query 1015. The ranking of the documents can be performed using traditional techniques for determining an information retrieval (IR) score for indexed documents in view of a given query. The relevance of a particular document with respect to a particular search term or to other provided information may be determined by any appropriate technique. For example, the general level of back-links to a document that contains matches for a search term may be used to infer a document's relevance. In particular, if a document is linked to (e.g., is the target of a hyperlink) by many other relevant documents (e.g., documents that also contain matches for the search terms), it can be inferred that the target document is particularly relevant. This inference can be made because the authors of the pointing documents presumably point, for the most part, to other documents that are relevant to their audience.

If the pointing documents are in turn the targets of links from other relevant documents, they can be considered more relevant, and the first document can be considered particularly relevant because it is the target of relevant (or even highly relevant) documents. Such a technique may be the determinant of a document's relevance or one of multiple determinants. The technique is exemplified in the GOGGLE® PageRank system, which treats a link from one web page to another as an indication of quality for the latter page, so that the page with the most such quality indicators is rated higher than others. Appropriate techniques can also be used to identify and eliminate attempts to cast false votes so as to artificially drive up the relevance of a page.

To further improve such traditional document ranking techniques, the ranking engine 1052 can receive an additional signal from a rank modifier engine 1056 to assist in determining an appropriate ranking for the documents. The rank modifier engine 1056 provides one or more prior models, or one or more measures of relevance for the documents based on one or more prior models, which can be used by the ranking engine 1052 to improve the search results' ranking provided to the user 1002. In general, a prior model represents a background probability of document result selection given the values of multiple selected features, as described further below. The rank modifier engine 1056 can perform one or more of the operations described below to generate the one or more prior models, or the one or more measures of relevance based on one or more prior models.

The search engine 1030 can forward the final, ranked result list within a server-side search results signal 1028*a* through the network 1012. Exiting the network 1012, a client-side search results signal 1028*b* can be received by the client device 1004*a* where the results can be stored within the RAM 1006 and/or used by the processor 1008 to display the results on an output device for the user 1002*a*.

Figure 2:
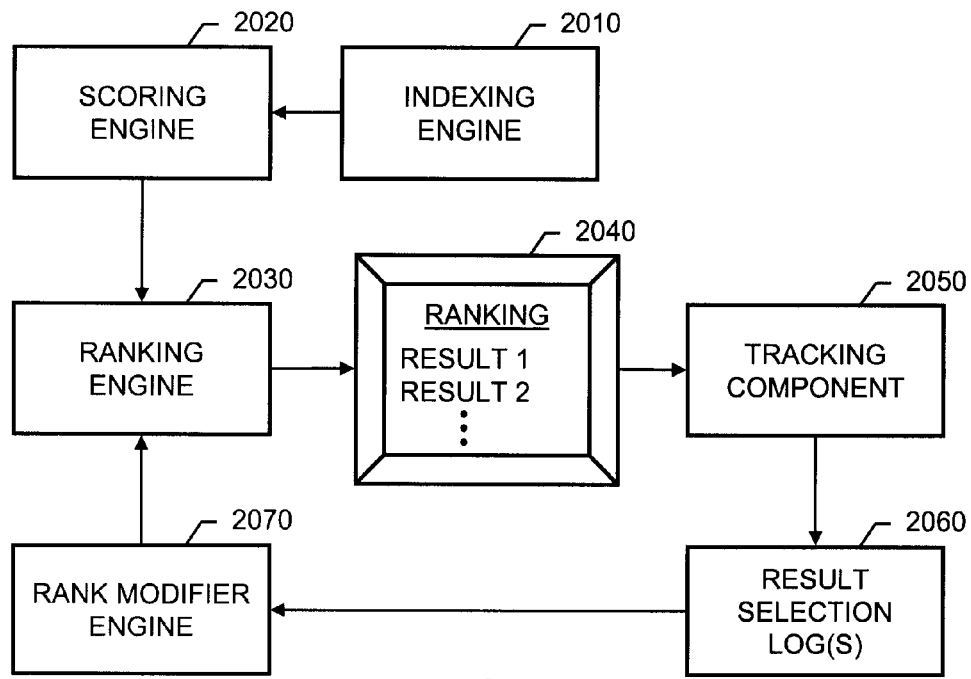
FIG. 2 shows example components of an information retrieval system.

FIG. 2 shows example components of an information retrieval system. These components can include an indexing engine 2010, a scoring engine 2020, a ranking engine 2030, and a rank modifier engine 2070. The indexing engine 2010 can function as described above for the indexing engine 1020. In addition, the scoring engine 2020 can generate scores for document results based on many different features, including content-based features that link a query to document results, and query-independent features that generally indicate the quality of document results. The content-based features can include aspects of document format, such as query matches to title or anchor text in an HTML (Hyper Text Markup Language) page. The query-independent features can include aspects of document cross-referencing, such as the PageRank of the document or the domain. Moreover, the particular functions used by the scoring engine 2020 can be tuned, to adjust the various feature contributions to the final IR score, using automatic or semi-automatic processes.

The ranking engine 2030 can produce a ranking of document results 2040 for display to a user based on IR scores received from the scoring engine 2020 and one or more signals from the rank modifier engine 2070. A tracking component 2050 can be used to record information regarding individual user selections of the results presented in the ranking 2040. For example, the tracking component 2050 can be embedded JavaScript code included in a web page ranking 2040 that identifies user selections (clicks) of individual document results and also identifies when the user returns to the results page, thus indicating the amount of time the user spent viewing the selected document result. In other implementations, the tracking component 2050 can be a proxy system through which user selections of the document results are routed, or the tracking component can include pre-installed software at the client (e.g., a toolbar plug-in to the client's operating system). Other implementations are also possible, such as by using a feature of a web browser that allows a tag/directive to be included in a page, which requests the browser to connect back to the server with message(s) regarding link(s) clicked by the user.

The recorded information can be stored in result selection log(s) 2060. The recorded information can include log entries that indicate, for each user selection, the query (Q), the document (D), the time (T) on the document, the language (L) employed by the user, and the country (C) where the user is likely located (e.g., based on the server used to access the IR system). Other information can also be recorded regarding user interactions with a presented ranking, including negative information, such as the fact that a document result was presented to a user, but was not clicked, position(s) of click(s) in the user interface, IR scores of clicked results, IR scores of all results shown before the clicked result, the titles and snippets shown to the user before the clicked result, the user's cookie, cookie age, IP (Internet Protocol) address, user agent of the browser, etc. Sill further information can be recorded, such as described below during discussion of the various features that can be used to build a prior model. Moreover, similar information (e.g., IR scores, position, etc.) can be recorded for an entire session, or multiple sessions of a user, including potentially recording such information for every click that occurs both before and after a current click.

The information stored in the result selection log(s) 2060 can be used by the rank modifier engine 2070 in generating the one or more signals to the ranking engine 2030. In general, a wide range of information can be collected and used to modify or tune the click signal from the user to make the signal, and the future search results provided, a better fit for the user's needs. Thus, user interactions with the rankings presented to the users of the information retrieval system can be used to improve future rankings.

The components shown in FIG. 2 can be combined in various manners and implemented in various system configurations. For example, the scoring engine 2020 and the ranking engine 2030 can be merged into a single ranking engine, such as the ranking engine 1052 of FIG. 1. The rank modifier engine 2070 and the ranking engine 2030 can also be merged, and in general, a ranking engine includes any software component that generates a ranking of document results after a query. Moreover, a ranking engine can be included in a client system in addition to (or rather than) in a server system.

Figure 3:
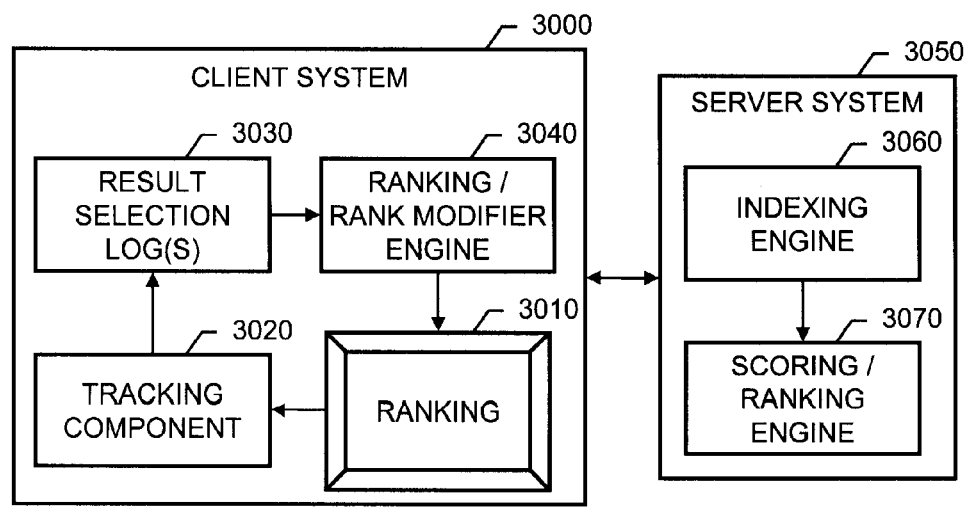
FIG. 3 shows another example information retrieval system.

FIG. 3 shows another example information retrieval system. In this system, a server system 3050 includes an indexing engine 3060 and a scoring/ranking engine 3070. A client system 3000 includes a user interface for presenting a ranking 3010, a tracking component 3020, result selection log(s) 3030 and a ranking/rank modifier engine 3040. For example, the client system 3000 can include a company's enterprise network and personal computers, in which a browser plug-in incorporates the ranking/rank modifier engine 3040. When an employee in the company initiates a search on the server system 3050, the scoring/ranking engine 3070 can return the search results along with either an initial ranking or the actual IR scores for the results. The browser plug-in can then re-rank the results locally based on tracked page selections for the company-specific user base.

Figure 4A:
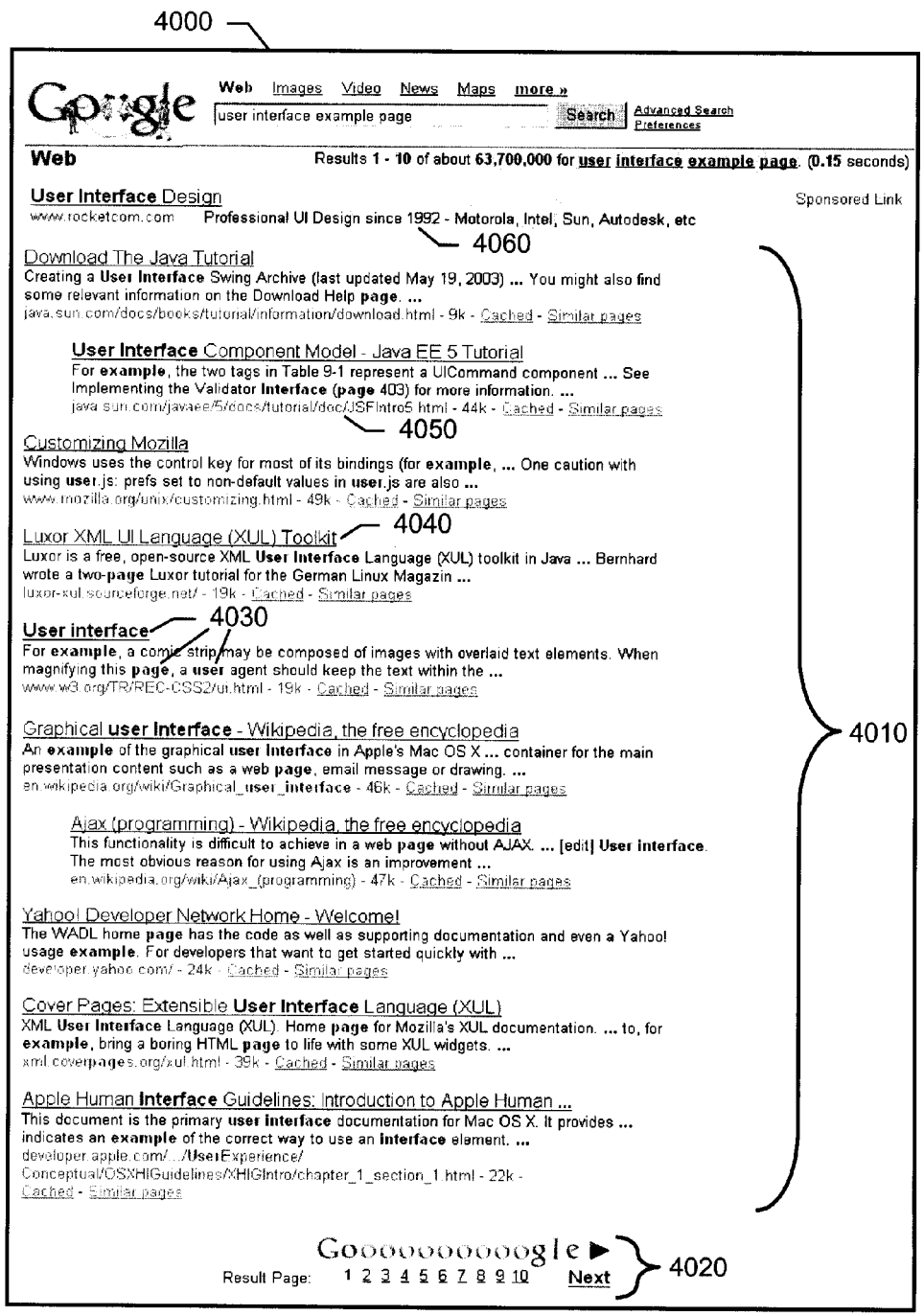
FIG. 4A shows an example user interface of a document search service for presenting a ranking.

FIG. 4A shows an example user interface 4000 of a document search service, such as described above, for presenting a ranking. Individual selections of document results 4010 can be tracked within the context of a search query for which the document results 4010 are returned. For example, in the context of this example web based information retrieval system, user's click data on web page search results 4010 can be gathered and stored in log(s), which can be kept for all user queries. When a user clicks on a search result, the click can be tracked via JavaScript code embedded in the search results page, an embedded browser tag, etc. This code can track when and on what a user clicks in the main search results page, and can track when the user returns to that main page.

Post-click behavior can also be tracked via pre-installed software at the client (e.g., a toolbar plug-in to the client's operating system). Provided the user opts into fully sharing their browsing behavior, the toolbar software can track all the pages that the user visits, both before and after the search results page is delivered.

The information gathered for each click can include: (1) the query (Q) the user entered, (2) the document result (D) the user clicked on, (3) the time (T) on the document, (4) the interface language (L) (which can be given by the user), (5) the country (C) of the user (which can be identified by the host that they use, such as www-google-co-uk to indicate the United Kingdom), and (6) additional aspects of the user and session. The time (T) can be measured as the time between the initial click through to the document result until the time the user comes back to the main page and clicks on another document result. Moreover, an assessment can be made about the time (T) regarding whether this time indicates a longer view of the document result or a shorter view of the document result, since longer views are generally indicative of quality for the clicked through result. This assessment about the time (T) can further be made in conjunction with various weighting techniques.

Document views resulting from the selections can be weighted based on viewing length information to produce weighted views of the document result. Thus, rather than simply distinguishing long clicks from short clicks, a wider range of click through viewing times can be included in the assessment of result quality, where longer viewing times in the range are given more weight than shorter viewing times. This weighting can be either continuous or discontinuous.

A continuous function can be applied to the document views resulting from the selections. Thus, the weight given to a particular click through time can fall within a continuous range of values, as defined by the specified function. Alternatively, a discontinuous function can be applied to the document views resulting from the selections. For example, there can be three viewing time categories, each having a corresponding weight. Note that such functions can be explicitly defined, or merely implicit in the software implementation.

In the case of discontinuous weighting, the individual selections of the document result can be classified into viewing time categories, and weights can be assigned to the individual selections based on results of the classifying. For example, a short click can be considered indicative of a poor page and thus given a low weight (e.g., −0.1 per click), a medium click can be considered indicative of a potentially good page and thus given a slightly higher weight (e.g., 0.5 per click), a long click can be considered indicative of a good page and thus given a much higher weight (e.g., 1.0 per click), and a last click (where the user doesn't return to the main page) can be considered as likely indicative of a good page and thus given a fairly high weight (e.g., 0.9). Note that the click weighting can also be adjusted based on previous click information. For example, if another click preceded the last click, the last click can be considered as less indicative of a good page and given only a moderate weight (e.g., 0.3 per click).

The various time frames used to classify short, medium and long clicks, and the weights to apply, can be determined for a given search engine by comparing historical data from user selection logs with human generated explicit feedback on the quality of search results for various given queries, and the weighting process can be tuned accordingly. Furthermore, these time frames and weights can be adjusted based on one or more viewing length differentiators, as is described further below.

The weighted views of the document result can be combined to determine a number to be used in determining a measure of relevance. For example, the weighted clicks described above can be summed together for a given query-document pair. Note that safeguards against spammers (users who generate fraudulent clicks in an attempt to boost certain search results) can be taken to help ensure that the user selection data is meaningful, even when very little data is available for a given (rare) query. These safeguards can include employing a user model that describes how a user should behave over time, and if a user doesn't conform to this model, their click data can be disregarded. The safeguards can be designed to accomplish two main objectives: (1) ensure democracy in the votes (e.g., one single vote per cookie and/or IP for a given query-URL (Universal Resource Locator) pair), and (2) entirely remove the information coming from cookies or IP addresses that do not look natural in their browsing behavior (e.g., abnormal distribution of click positions, click durations, clicks_per_minute/hour/day, etc.). Suspicious clicks can be removed, and the click signals for queries that appear to be spammed need not be used (e.g., queries for which the clicks feature a distribution of user agents, cookie ages, etc. that do not look normal).

A measure of relevance for the document result can be determined within the context of the search query for which the document result is returned. This measure of relevance can be calculated as a fraction, which can be directly applied to IR scores of the search results, thereby boosting the documents in the resulting ranking that have implicit user feedback indicating document quality. For example, a traditional click fraction, which takes into consideration the other results for the given query, has been defined as follows:

$$\text{BASE} = [\#WC(Q,D)] / [\#WC(Q) + S0]$$

where $\#WC(Q,D)$ is the sum of weighted clicks for a query-URL pair, $\#WC(Q)$ is the sum of weighted clicks for the query (summed over all results for the query), and $S0$ is a smoothing factor.

The click fraction can also employ per-language and per-country fractions (with smoothing there between):

$$\text{LANG} = [\#WC(Q,D,L) + S1 \cdot \text{BASE}] / [\#WC(Q,L) + S1]$$

$$\text{COUNTRY} = [\#WC(Q,D,L,C) + S2 \cdot \text{LANG}] / [\#WC(Q,L,C) + S2]$$

where LANG incorporates language specific click data, plus BASE, and COUNTRY incorporates country (and language) specific click data, plus LANG. In this manner, if there is less data for the more specific click fractions, the overall fraction falls back to the next higher level for which more data is available.

Furthermore, it should be noted that different smoothing factors S0, S1 and S2 can be used, or one or more of these can be the same smoothing factor. The smoothing factors used can be determined based on how much traffic is received within the context of the click fraction. For example, for a given country-language tuple, the smoothing factor can be raised concordant with the amount of traffic received (e.g., a larger smoothing factor can be used for US-English queries if a good deal more of such queries are received). In addition, the smoothing factor can be increased for query sources that have historically generated more spamming activity (e.g., queries from Russia).

In addition, as mentioned above, one or more viewing length differentiators (e.g., query category and user type) can be identified for use in the weighting. A viewing length differentiator can include a factor governed by a determined category of the search query, a factor governed by a determined type of a user generating the individual selections, or a combination of them. The document views can be weighted based on the viewing length information in conjunction with the viewing length differentiator(s), such as the determined category of the search query and the determined type of the user. Thus, in the discontinuous weighting case (and the continuous weighting case), the threshold(s) (or formula) for what constitutes a good click can be evaluated on query and user specific bases. For example, the query categories can include "navigational" and "informational", where a navigational query is one for which a specific target page or site is likely desired (e.g., a query such as "BMW"), and an informational query is one for which many possible pages are equally useful (e.g., a query such as "George Washington's Birthday"). Note that such categories may also be broken down into sub-categories as well, such as informational-quick and informational-slow: a person may only need a small amount of time on a page to gather the information they seek when the query is "George Washington's Birthday", but that same user may need a good deal more time to assess a result when the query is "Hilbert transform tutorial".

The query categories can be identified by analyzing the IR scores or the historical implicit feedback provided by the click fractions. For example, significant skew in either of these (meaning only one or a few documents are highly favored over others) can indicate a query is navigational. In contrast, more dispersed click patterns for a query can indicate the query is informational. In general, a certain category of query can be identified (e.g., navigational), a set of such queries can be located and pulled from the historical click data, and a regression analysis can be performed to identify one or more features that are indicative of that query type (e.g., mean staytime for navigational queries versus other query categories; the term "staytime" refers to time spent viewing a document result, also known as document dwell time).

Traditional clustering techniques can also be used to identify the query categories. This can involve using generalized clustering algorithms to analyze historic queries based on features such as the broad nature of the query (e.g., informational or navigational), length of the query, and mean document staytime for the query. These types of features can be measured for historical queries, and the threshold(s) can be adjusted accordingly. For example, K means clustering can be performed on the average duration times for the observed queries, and the threshold(s) can be adjusted based on the resulting clusters.

User types can also be determined by analyzing click patterns. For example, computer savvy users often click faster than less experienced users, and thus users can be assigned different weighting functions based on their click behavior. These different weighting functions can even be fully user specific (a user group with one member). For example, the average click duration and/or click frequency for each individual user can be determined, and the threshold(s) for each individual user can be adjusted accordingly. Users can also be clustered into groups (e.g., using a K means clustering algorithm) based on various click behavior patterns.

Moreover, the weighting can be adjusted based on the determined type of the user both in terms of how click duration is translated into good clicks versus not-so-good clicks, and in terms of how much weight to give to the good clicks from a particular user group versus another user group. Some user's implicit feedback may be more valuable than other users due to the details of a user's review process. For example, a user that almost always clicks on the highest ranked result can have his good clicks assigned lower weights than a user who more often clicks results lower in the ranking first (since the second user is likely more discriminating in his assessment of what constitutes a good result). In addition, a user can be classified based on his or her query stream. Users that issue many queries on (or related to) a given topic (e.g., queries related to law) can be presumed to have a high degree of expertise with respect to the given topic, and their click data can be weighted accordingly for other queries by them on (or related to) the given topic.

Nonetheless, despite all the above techniques for developing a robust implicit user feedback model, presentation (or display) bias can unduly influence the effectiveness of implicit user feedback. Presentation bias includes various aspects of presentation, such as an attractive title or snippet provided with the document result, and where the document result appears in the presented ranking (position). Note that users tend to click results with good snippets, or that are higher in the ranking, regardless of the real relevance of the document to the query as compared with the other results.

As shown in FIG. 4A, many other factors, independent of quality, affect the likelihood of a result being clicked. For example, the presented rank (the position) of the document results 4010 is highly correlated with click rate in the sense that the top result will receive many more clicks than the last result, even if their positions are swapped. The user interface 4000 presents the search results for the query using multiple pages, and an interface element 4020 allows the user to view additional pages of search results as desired. Thus, many of the document results for a typical search may never be viewed at all by the user.

In general, the presentation of the results in the page can have a big impact on the observed click rates, and various aspects of presentation are often independent of the quality of a given result. The bolding 4030 of the results (both in the title and the snippet), length of titles 4040, indenting 4050, presence of ads 4060 (or similar objects that appear above the first result for a given query) can affect the observed click rates. Thus, in order to accurately predict the quality of a result based on click signals, the effects of presentation bias should be factored out. Note that the presented rank (the position) of a document result is really a mixed feature since clicks based on position are influenced by both the presentation bias aspect and the result quality aspect, and thus in some implementations, position can be treated as a quality feature (limiting the bias features to those features that are unconnected with result quality, e.g., bolding, length of title, length of snippet, presence of ads, etc.).

Figure 4B:
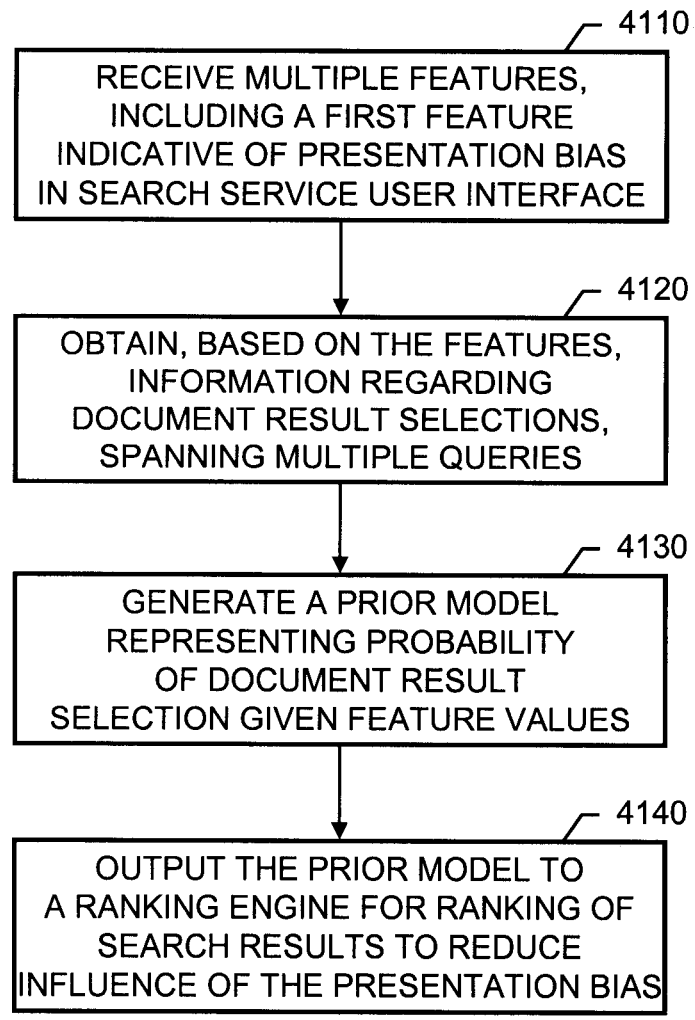
FIG. 4B shows an example process of building a prior model for use in factoring out presentation bias and enhancing the quality of signals from document result selections.

FIG. 4B shows an example process of building a prior model for use in factoring out presentation bias and enhancing the quality of signals from document result selections. Multiple features can be received 4110, including a first feature indicative of presentation bias that affects document result selection for search results presented in a user interface of a document search service. For example, the first feature can be the position of the document result in the user interface within the context of the search query for which the document result is returned, and a second feature can be the language (L) of the search query. In general, the set of features used can include features that are correlated with click rate and that are independent of the query (Q) and the search result (D). However, in some implementations, the specific query (Q) or the general type of query (e.g., as defined by query clustering) can be used as a feature in the prior model. In any event, the selection of features, which are predictive of click through, can be guided by standard information gain feature selection techniques.

Figure 4C:
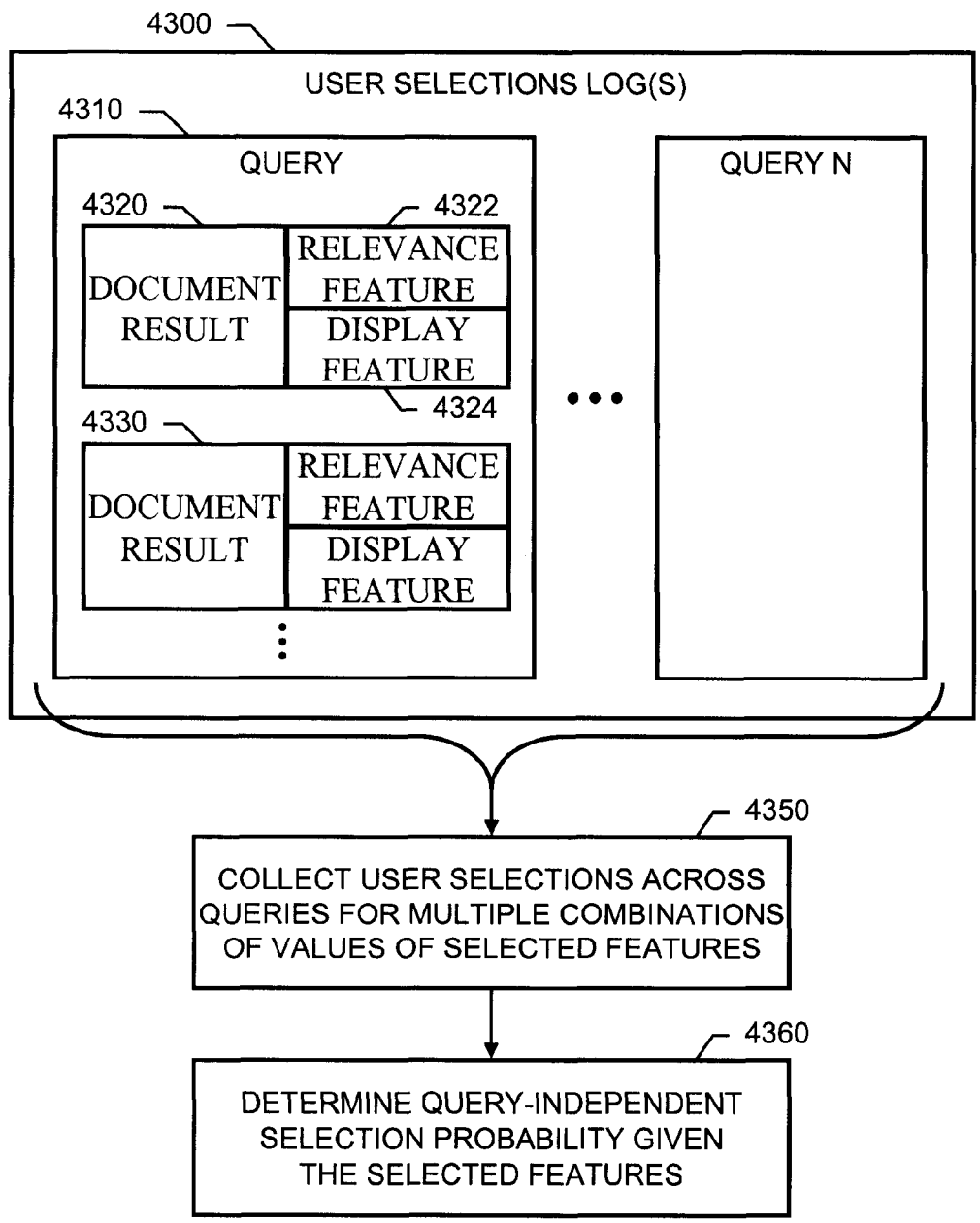
FIG. 4C shows example features and an example process of building a prior model.

Based on the multiple features, information regarding document result selections for searches performed using the document search service can be obtained 4120, where the information spans multiple different queries. This information can be used to generate 4130 a prior model, where the prior model represents a probability of document result selection (e.g., a query-independent probability of selection) given values of the multiple features. For example, FIG. 4C shows example features and an example process of building a prior model.

One or more user selection log(s) 4300 include click through data, such as described above. These user selection log(s) 4300 can be understood conceptually as a set of queries, including a first query 4310 through query N, where many user searches, and document result selections, have been observed within the context of each query. A query 4310 includes a document result 4320 that was selected by a user, and the document result 4320 can have an associated relevance feature 4322 (e.g., the IR score of the document) and an associated display bias feature 4324 (e.g., the position of the document).

In addition, another document result 4330, which was returned along with first document result 4320 within the context of the query 4310, has its own associated relevance feature and display bias feature. These features of the document result 4330, presented along with the document result 4320, can be considered features of the document result 4320. Thus, for example, even if the document result 4330 was never selected, the IR score of the document result 4330 can be saved as a feature of the document result 4320, which was selected, in a single log entry including the IR score of the result 4320, the position of result 4320, and the IR score of the result 4330 returned along with result 4320. Note that being "returned along with" does not indicate the two documents were necessarily displayed in the same page of the user interface, but only that the two documents were included in the search results for the given query.

Thus, given a set of selected features, user selections can be collected 4350 from the user selection log(s) 4300 across queries (e.g., independent of query) for multiple combinations of values of the selected features, where those features can include a feature related to another document returned along with a selected document within the context of a query. This collecting can involve accumulating counts observed in the log(s) 4300, including separately accumulating short, medium and long clicks, as well as the event of a result being shown, but another result being clicked.

A query-independent selection probability can be determined 4360 given the selected features. For example, in the case of the features being position and language, the number of long, short and medium clicks at position 1 on an English language search site can be extracted from the log(s) 4300, as well as the number of times other results have been clicked while a result at position 1 on the English language search site has been shown. These numbers can be found for every combination of position and language to determine the query-independent selection probability. In general, a mapping can be computed (based on the log(s) 4300) between the selected feature values and a predicted click through rate to produce a prior model for the selected features.

If the number of feature value combinations is too large (e.g., due to limitations on data storage or processing resources), the features can be split into two groups. The first group can include a reduced set of more important features, and the second group can contain the rest (i.e., two disjoint groups forming the full set of features). The first group can be used for accumulating click counts based on all possible combinations of feature values in the first group. With the click counts collected, the prior model can be trained on the values of the second group of features. Note that the prior model can be a standard linear or logistic regression, or other model types. In general though, the prior model can essentially represent the statistics of historical click data, indicating what percentage of people clicked on a result given presentation of the result and the set of features. Moreover, splitting the features into two groups can allow the use of a larger number of parameters in the model (for every combination of feature values in group one), but not so many parameters that the model cannot be trained.

Referring again to FIG. 4B, the prior model can be output 4140 to a ranking engine for ranking of search results to reduce influence of the presentation bias. The prior model can be saved to a computer-readable medium for use by the ranking engine, or otherwise made available to the ranking engine. Subsequent to this, and given a search event (query+a set of results), the features of the prior model can be evaluated, the combination of feature values for a given result can be looked up in the prior model to find a click through rate predicted by the prior model, and this predicted click through rate can be compared with the click through rate given by a separate implicit user feedback model (e.g., the traditional click fraction described above) to reduce the influence of the presentation bias represented by the prior model.

For example, for the position prior model described above, the ranking score of a search result can be multiplied by a number smaller than one if the traditional click fraction is smaller than the click fraction predicted by the prior model, or by a number greater than one otherwise. Thus, the prior model can be used to clean the signal of an implicit user feedback model that gives a measure of relevance for a document result within the context of the search query for which the document result is returned, thereby reducing the affects of presentation bias. In general, various uses can be made of, or transforms applied to the output signal of the prior model before application to search result ranking for a new search. For example, the following formulas can be used:

$$\text{Boost} = C(a/p),$$

where p is the predicted click fraction, a is the actual click fraction, and C is a tuned parameter;

$$\text{Boost} = \max(\min(1+Z, m0), m1), \text{ where}$$

$Z = (a-p)^\wedge k1$ if $a \geq p$,
$Z = -1 * \text{abs}((a-p)^\wedge k2)$ if $a < p$,
p is the predicted click fraction, a is the actual click fraction, and m0, m1, k1 and k2 are tuned parameters;

$$\text{Boost} = \max(\min(1+Z, m0), m1), \text{ where}$$

$Z = C[1/(1+e^\wedge(-k(a-p)))] - \frac{1}{2}$,
p is the predicted click fraction, a is the actual click fraction, and m0, m1, k and C are tuned parameters.

In any event, the manner in which the output signal of the prior model is used can be adjusted based on the specific implementation and historical data combined with human generated relevance ratings (e.g., employed in a tuning process to select an appropriate boosting transform for a given implementation). Moreover, the prior model can be used to modify and improve the ranking of search results generated for a given query, and the modified ranking can be presented to a user (e.g., on a display device in a web browser user interface).

Figure 4D:
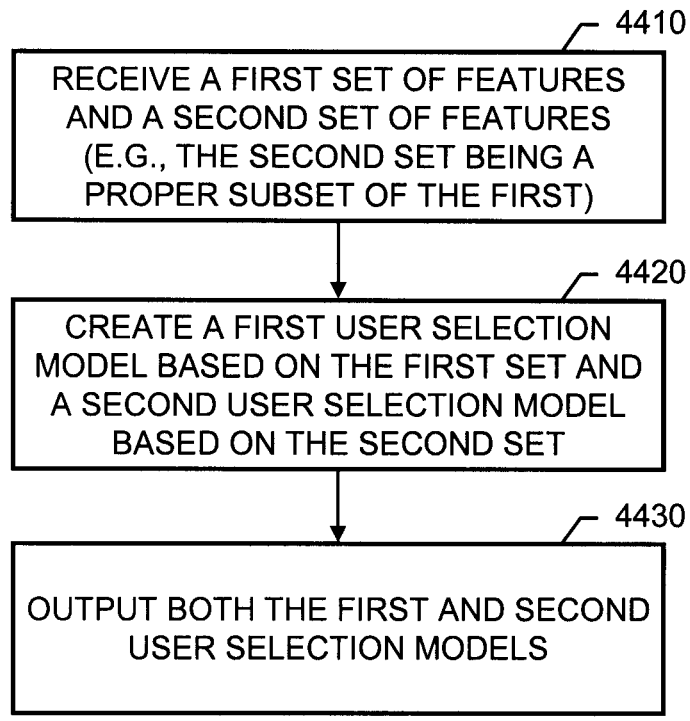
FIG. 4D shows another example process of building a prior model.

FIG. 4D shows another example process of building a prior model. In this example, the prior model is composed of two prior models whose signals are combined to form a display bias signal that is largely uncorrelated with the quality of the document result. A first set of features and a second set of features are received 4410, where the first set of features includes a feature that is indicative of presentation bias for a first document result, and the second set of features includes a feature that is indicative of relevance for a second document result returned along with the first document result within the context of a search query.

For example, the second set of features can include position, IR score, IR score of the top result, IR score of the previous result(s), IR score of the next result(s), country, language, and number of words in the query; and the first set of features can include the above features, plus the number of bold terms in the title of the current result, the number of bold terms in the title of the previous result(s), the number of bold terms in the title of next result(s), the number of bold terms in the snippet of the current result, the number of bold terms in the snippet of the previous result(s), the number of bold terms in the snippet of the next result(s), the length of the title of the current result, the length of the title of the previous result(s), the length of the title of next result(s), the length of the snippet of the current result, the length of the snippet of the previous result(s), the length of the snippet of the next result(s), a Boolean indicator of whether any pornographic terms were shown (e.g., in the current result, the previous result(s) and the next result(s)), a Boolean indicator of whether an ad was shown, and a Boolean indicator of whether a special result was shown.

Two prior models can be created 4420 using the two sets of features: a first user selection model based on the first set of features and a second user selection model based on the second set of features, using the techniques described above. Thus, the second user selection model can be built on features that are highly correlated with the quality of the result, and the first user selection model can be built on those features and presentation bias features. Any difference between these two models then is likely to be due only to presentation bias.

Both the first and second user selection models can be output 4430 to a ranking engine for ranking of search results. For example, for every search event, the ratio of the click fraction predicted by the second prior model over the click fraction predicted by the first prior model can be computed (based on the observed feature values) for every document result, and the ranking score of each document result can be multiplied by its corresponding ratio, or by a monotonic function of this ratio. The basic rationale embodied by this approach is that, if a result is expected to have a higher click rate due to presentation bias, this result's click evidence should be discounted; and if the result is expected to have a lower click rate due to presentation bias, this result's click evidence should be over-counted.

It should be appreciated that many different prior models can be generated using the techniques described above. The various features that can be used to generate prior models can include all those described above, plus any of the additional features detailed in the following table:

| Name | Description | Effect on Click Fractions |
|---|---|---|
| Position | The order in which results are presented. | Results in higher positions can get higher click through rates. |
| Page | The page in which the result is presented. | Results in higher pages can get higher click through rates. |
| Porn Terms (attractive terms) | Terms in the title, snippet and URL that are sexually suggestive | Results with more porn terms (attractive terms) can get higher click through rates. |

-continued

| Name | Description | Effect on Click Fractions |
|---|---|---|
| | (note that porn term can also be defined more broadly to include any term that increases the click-through rate of any result in which it appears, independent of the actual query or url). | |
| Bold Terms | Terms in the title, snippet and URL that are bolded. | Results with more bolded terms can get higher click through rates. |
| Position of Bold Terms | Position of bold terms in the title, snippet and URL. | Bold terms have different impact if they appear at the beginning of the sentence, or at the end. |
| Lengths of Title, Snippet and URL | Number of terms in the title and snippet or length of the URL. | Results with longer titles, snippets and URLs can get higher click through rates. |
| Quality of Previous Results | The quality (e.g., IR score) of the results in previous positions. | Results that have high quality results in previous positions can get lower click through rates. |
| Quality of Next Results | The quality (e.g., IR score) of the results in the next positions. | Results that have high quality results in the next positions can get lower click through rates. |
| Features of Previous Pages | Various features of the previous pages (e.g., bolding and length of titles and snippets, IR scores). | Users' attraction to previous pages can affect click through rate for a result. |
| Features of Next Pages | Various features of the next pages (e.g., bolding and length of titles and snippets, IR scores). | Users' attraction to next pages can affect click through rate for a result. |
| Ads | Advertisements presented. | Better quality ads can lower the click through rate for all results. |
| Onebox | Special result shown prior to the normal search results (e.g., maps, book search, etc.) | These extra results can lower the click through rate on the normal search results, especially if they are very topical. |
| Query Length | The number of terms in the query. | The number of terms in the query can impact the click through rate of a result (e.g., good results may be lacking for longer queries). |
| Query Type | Clustering of queries, either through explicit labeling of cluster types or through automatic clustering techniques. | Various query clusters can affect the click through rate. |
| Query | The specific set of term(s) used for the search. | Specific queries can have different click through rates. |
| Rank-independent format and appearance of presentation (e.g., Indentation) | Aspect of presentation that is orthogonal to rank itself (e.g., Indentation of results, which can indicate a page deeper within the network domain of the previous result). | Variations in format and appearance that indicate an aspect of a result separate from result quality (e.g., Indentation) can raise or lower the click through rate for a result. |
| Other format and appearance of presentation (e.g., color of presentation) | Aspect of presentation that may be connected with the rank itself (e.g., background color of certain results). | Variations in format and appearance that indicate an aspect of a result that may be connected with result quality (e.g., some top results may appear on a light blue background) can raise or lower the click through rate for a result. |
| Other UI Features | Any arbitrary number of methods to place | Any aspect of presentation that causes a result to stand |

-continued

| Name | Description | Effect on Click Fractions |
|---|---|---|
| | results in a result list. | out amongst a list of results can affect the click through rate for the result. |
| Features of custom search engines | Search boxes that appear on external sites. | Results served on custom search engines are affected by many potential display bias features. The layout of the page, the color of the links, flash ads on the page, number of links that are present on the page besides the search results, etc. |

Figure 4E:
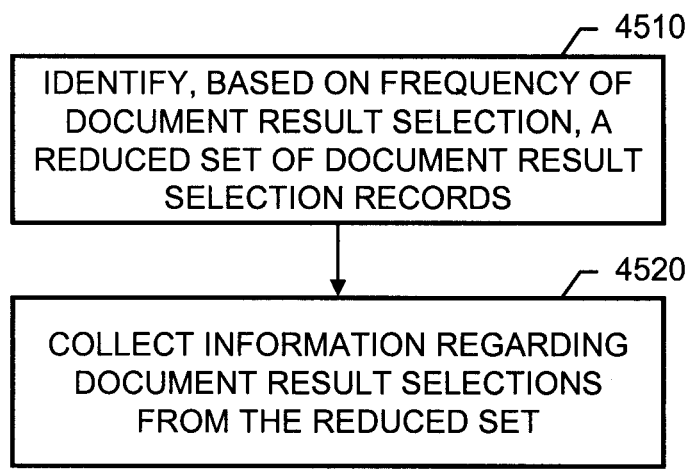
FIG. 4E shows an example process of building a prior model used to predict a measure of implicit user feedback for a result having no previously recorded user selections.

In addition, multiple different types of prior models can be built and used in conjunction with each other. FIG. 4E shows an example process of building a prior model used to predict a measure of implicit user feedback for a result having no previously recorded user selections. A reduced set of document result selection records can be identified 4510 based on frequency of document result selection. For example, the log(s) 4300 can be randomly split into two halves, and the results that have click evidence in the first half, but do not have any click evidence in the second half, can be extracted. Thus, the reduced set of document result selection records corresponds to the set of documents that are less frequently selected according to the log(s).

Information regarding document result selections can be collected 4520 from this reduced set, and a prior model can be built on this information using the techniques described above. For example, a prior model can be built on the extracted results and features such as position, country, language and IR score. If a result for a new search does not appear at all in the regular implicit user feedback model (e.g., the traditional click fraction is undefined for the result because the result has not been selected before) this result can be assigned a click fraction as predicted by this additional prior model for ranking purposes.

Figure 4F:
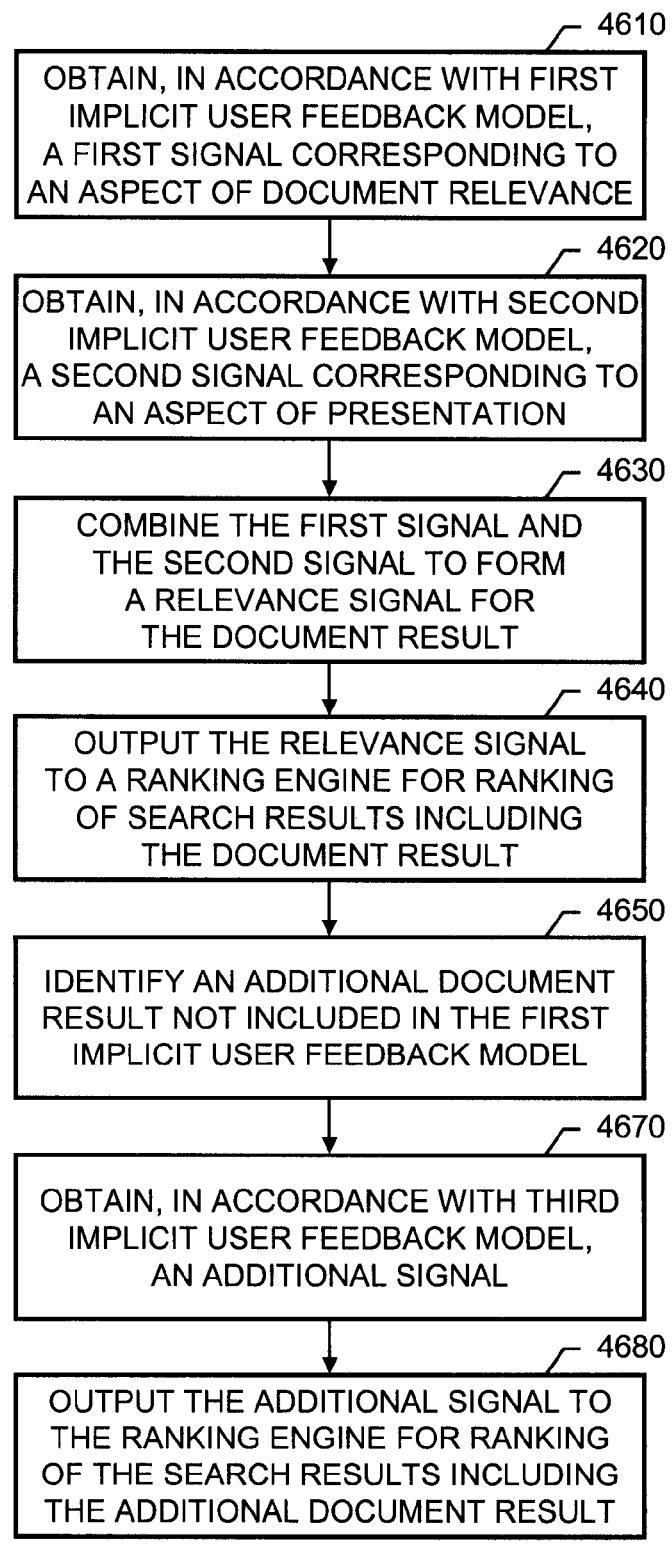
FIG. 4F shows an example process of using implicit user feedback models to form a relevance signal for a document result, within the context of a search query, for ranking purposes.

FIG. 4F shows an example process of using implicit user feedback models to form a relevance signal for a document result, within the context of a search query, for ranking purposes. A first signal can be obtained 4610, in accordance with a first implicit user feedback model, for a document result of a search query for which the document result is returned, where the first signal corresponds to an aspect of document relevance. For example, the first signal can include a measure of relevance for the document result within a context of the search query for which the document result is returned (e.g., the first signal can be the traditional click fraction). Alternatively, the first signal can include a measure of relevance for the document result independent of a context of the search query for which the document result is returned (e.g., the first signal can be the output of the second user selection model described above in connection with FIG. 4D).

A second signal can be obtained 4620, in accordance with a second implicit user feedback model, for the document result, where the second signal corresponds to an aspect of search result presentation. For example, the second signal can include a measure of presentation bias for the document result independent of the context of the search query for which the document result is returned (e.g., the second signal can be the output of a prior model built using the techniques described above in connection with FIGS. 4A-4C, such as the first user selection model described above in connection with FIG. 4D). The first signal and the second signal can be combined 4630 to form a relevance signal for the document result, the relevance signal being generally independent of presentation. The relevance signal can be output 4640 to a ranking engine for ranking of search results including the document result.

Furthermore, an additional document result of the search query can be identified 4650 that is not included in the first implicit user feedback model (e.g., a document result for which the traditional click fraction is not defined). An additional signal can be obtained 4670, in accordance with a third implicit user feedback model, for the additional document result, where the additional signal corresponds to an aspect of document relevance independent of the context of the search query (e.g., the additional signal can be the output of the prior model described above in connection with FIG. 4E). The additional signal can also be output 4680 to the ranking engine for ranking of the search results including the additional document result.

Figure 5:
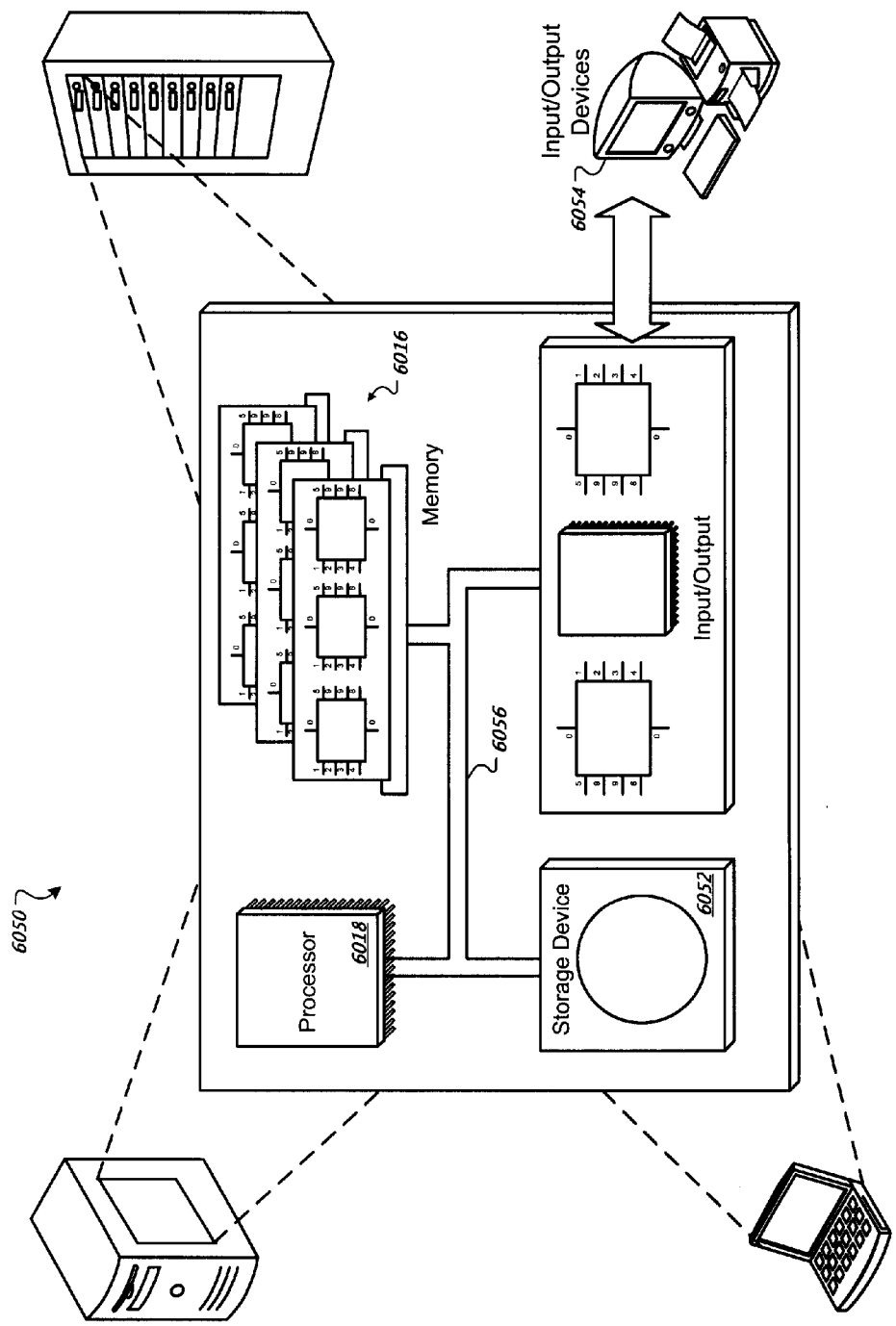
FIG. 5 is a schematic diagram of an example computer system.

FIG. 5 is a schematic diagram of an example computer system 6050. The system 6050 can be used for practicing operations described above. The system 6050 can include a processor 6018, a memory 6016, a storage device 6052, and input/output devices 6054. Each of the components 6018, 6016, 6052, and 6054 are interconnected using a system bus 6056. The processor 6018 is capable of processing instructions within the system 6050. These instructions can implement one or more aspects of the systems, components and techniques described above. In some implementations, the processor 6018 is a single-threaded processor. In other implementations, the processor 6018 is a multi-threaded processor. The processor 6018 can include multiple processing cores and is capable of processing instructions stored in the memory 6016 or on the storage device 6052 to display graphical information for a user interface on the input/output device 6054.

The memory 6016 is a computer readable medium such as volatile or non volatile that stores information within the system 6050. The memory 6016 can store processes related to the functionality of the search engine 1030, for example. The storage device 6052 is capable of providing persistent storage for the system 6050. The storage device 6052 can include a floppy disk device, a hard disk device, an optical disk device, or a tape device, or other suitable persistent storage mediums. The storage device 6052 can store the various databases described above. The input/output device 6054 provides input/output operations for the system 6050. The input/output device 6054 can include a keyboard, a pointing device, and a display unit for displaying graphical user interfaces.

The computer system shown in FIG. 5 is but one example. In general, embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Moreover, the server environment, which is configured to provide electronic search service and employ the ranking systems and techniques described, need not be implemented using traditional back-end or middleware components. The server environment can be implemented using a program installed on a personal computing apparatus and used for electronic search of local files, or the server environment can be implemented using a search appliance (such as GOOGLE® in a Box, provided by Google Inc. of Mountain View, Calif.) installed in an enterprise network.

Other implicit user feedback models can be used in place of the traditional click fraction model described. For example, an implicit user feedback model employing a large-scale logistic regression model that uses the actual query and url as features can be used. The new prior models can be used to denormalize any query-specific click model.

In addition, the prior model(s) can be applied in varying manners. For example, a prior model can be applied at run time as an adjustment to the ranking boost given to a document in accordance with the implicit user feedback model since the set of features used for the prior model can be available for direct input at run time. Alternatively, the prior model can be applied at model building time, where features are fetched from the log(s), which can result in improved response time during searches. In addition, when the model is applied at building time, the implicit feedback can be adjusted per each click record before aggregating the feedback from multiple clicks into a signal. This adjustment can be for instance a weighting of the clicks according to how much they were affected by display bias before the clicks are aggregated. At run time, the signal is typically only adjusted after the clicks were already aggregated, which can result in some loss of precision.

What is claimed is:

1. A computer-implemented method comprising:
obtaining information regarding selections of search results provided in response to a plurality of search queries, the obtained information for one or more of the selected search results comprising one or more presentation bias features of a presentation of the search result and one or more relevancy features of the search result, wherein at least one of the presentation bias features is a rank of the search result in the search results;
training a model using the obtained information, wherein the model is trained to predict a click through rate based on input comprising the one or more presentation bias features and the one or more relevancy features; and
providing the model for use with a search engine, wherein the search engine is configured to provide presentation bias and relevancy features of given search results as input to the model and to use predictive outputs of the model to reduce presentation bias in a presentation of the given search results by determining a quality score for each of the given search results and factoring out independent effects of presentation bias from the quality scores using the predictive outputs of the model, wherein the predictive outputs used to reduce the presentation bias in the presentation of the given search results include a predicted click through rate predicted based on the presentation bias and relevancy features of the given search results and the model.

2. The method of claim 1 wherein the model is a linear model or a regression model.

3. The method of claim 1 wherein the one or more presentation bias features include a position of another search result in the graphical user interface, a title of the search result, a length of the title, a snippet for the search result, bolded text within the snippet, or whether one or more advertisements were presented with the search result.

4. The method of claim 1 wherein the one or more relevancy features include an information retrieval score of the search result, an information retrieval score of another search result returned along with the search result, a language of the query, or a count of words in the query.

5. The method of claim 1 wherein training the model comprises:
training a first model using the obtained presentation bias features to predict a click through rate based on input comprising the one or more presentation bias features; and
training a second model using the obtained relevancy features to predict a click through rate based on input comprising the one or more relevancy features.

6. The method of claim 5 wherein providing the model for use with the search engine comprises providing the first and second models for use with the search engine, wherein the search engine is configured to use predictive outputs of the first and second models to adjust respective ranking scores of the given search results obtained as the search results for the given query to reduce presentation bias in a presentation of the given search results, and wherein the search engine is configured to provide the presentation bias and relevance features of the given search results as input to the first and second models.

7. The method of claim 5 wherein the predicted click through rate for the particular second search result is a ratio of the respective predictive outputs of the first and second models.

8. The method of claim 1 wherein the search engine is further configured to use comparisons of the predictive outputs of the model with an implicit user feedback model to adjust respective ranking scores of the given search results.

9. The method of claim 8 wherein the implicit user feedback model is a click fraction.

10. A system comprising:
    data processing apparatus programmed to perform operations comprising:
        obtaining information regarding selections of search results provided in response to a plurality of search queries, the obtained information for one or more of the selected search results comprising one or more presentation bias features of a presentation of the search result and one or more relevancy features of the search result, wherein at least one of the presentation bias features is a rank of the search result in the search results;
        training a model using the obtained information, wherein the model is trained to predict a click through rate based on input comprising the one or more presentation bias features and the one or more relevancy features; and
        providing the model for use with a search engine, wherein the search engine is configured to provide presentation bias and relevancy features of given search results as input to the model and to use predictive outputs of the model to reduce presentation bias in a presentation of the given search results by determining a quality score for each of the given search results and factoring out independent effects of presentation bias from the quality scores using the predictive outputs of the model, wherein the predictive outputs used to reduce the presentation bias in the presentation of the given search results include a predicted click through rate predicted based on the presentation bias and relevancy features of the given search results and the model.

11. The system of claim 10 wherein the model is a linear model or a regression model.

12. The system of claim 10 wherein the one or more presentation bias features include a position of another search result in the graphical user interface, a title of the search result, a length of the title, a snippet for the search result, bolded text within the snippet, or whether one or more advertisements were presented with the search result.

13. The system of claim 10 wherein the one or more relevancy features include an information retrieval score of the search result, an information retrieval score of another search result returned along with the search result, a language of the query, or a count of words in the query.

14. The system of claim 10 wherein training the model comprises:
    training a first model using the obtained presentation bias features to predict a click through rate based on input comprising the one or more presentation bias features; and
    training a second model using the obtained relevancy features to predict a click through rate based on input comprising the one or more relevancy features.

15. The system of claim 14 wherein providing the model for use with the search engine comprises providing the first and second models for use with the search engine, wherein the search engine is configured to use predictive outputs of the first and second models to adjust respective ranking scores of the given search results obtained as the search results for the given query to reduce presentation bias in a presentation of the given search results, and wherein the search engine is configured to provide the presentation bias and relevance features of the given search results as input to the first and second models.

16. The system of claim 15 wherein the search engine is further configured to use ratios of the predictive outputs of the first and second models to adjust the respective ranking scores of the given search results.

17. The system of claim 10 wherein the search engine is further configured to use comparisons of the predictive outputs of the model with an implicit user feedback model to adjust respective ranking scores of the given search results.

18. The system of claim 17 wherein the implicit user feedback model is a click fraction, and the search engine is configured to use a comparison of the predicted click through rate and the click fraction to adjust the respective ranking scores of the given search results, the comparison including at least one of a ratio of the predicted click through rate and the click fraction or a value difference between the predicted click through rate and the click fraction.

19. A machine-readable storage device having instructions stored thereon that, when executed by data processing apparatus, cause the data processing apparatus to perform operations comprising:
    obtaining information regarding selections of search results provided in response to a plurality of search queries, the obtained information for one or more of the selected search results comprising one or more presentation bias features of a presentation of the search result and one or more relevancy features of the search result, wherein at least one of the presentation bias features is a rank of the search result in the search results;
    training a model using the obtained information, wherein the model is trained to predict a click through rate based on input comprising the one or more presentation bias features and the one or more relevancy features; and
    providing the model for use with a search engine, wherein the search engine is configured to provide presentation bias and relevancy features of given search results as input to the model and to use predictive outputs of the model to reduce presentation bias in a presentation of the given search results by determining a quality score for each of the given search results and factoring out independent effects of presentation bias from the quality scores using the predictive outputs of the model, wherein the predictive outputs used to reduce the presentation bias in the presentation of the given search results include a predicted click through rate predicted based on the presentation bias and relevancy features of the given search results and the model.

20. The machine-readable storage of claim 19 wherein the model is a linear model or a regression model.

21. The machine-readable storage of claim 19 wherein the one or more presentation bias features include a position of another search result in the graphical user interface, a title of the search result, a length of the title, a snippet for the search result, bolded text within the snippet, or whether one or more advertisements were presented with the search result.

22. The machine-readable storage of claim 19 wherein the one or more relevancy features include an information retrieval score of the search result, an information retrieval score of another search result returned along with the search result, a language of the query, or a count of words in the query.

23. The machine-readable storage of claim 19 wherein training the model comprises:
   training a first model using the obtained presentation bias features to predict a click through rate based on input comprising the one or more presentation bias features; and
   training a second model using the obtained relevancy features to predict a click through rate based on input comprising the one or more relevancy features.

24. The machine-readable storage of claim 23 wherein providing the model for use with the search engine comprises providing the first and second models for use with the search engine, wherein the search engine is configured to use predictive outputs of the first and second models to adjust respective ranking scores of the given search results obtained as the search results for the given query to reduce presentation bias in a presentation of the given search results, and wherein the search engine is configured to provide the presentation bias and relevance features of the given search results as input to the first and second models.

25. The machine-readable storage of claim 24 wherein the search engine is further configured to use ratios of the predictive outputs of the first and second models to adjust the respective ranking scores of the given search results.

26. The machine-readable storage of claim 19 wherein the search engine is further configured to use comparisons of the predictive outputs of the model with an implicit user feedback model to adjust respective ranking scores of the given search results.

27. The machine-readable storage of claim 26 wherein the implicit user feedback model is a click fraction, and the search engine is configured to use a comparison of the predicted click through rate and the click fraction to adjust the respective ranking scores of the given search results, the comparison including at least one of a ratio of the predicted click through rate and the click fraction or a value difference between the predicted click through rate and the click fraction.

* * * * *